(12) United States Patent
Dimou et al.

(10) Patent No.: US 12,381,656 B2
(45) Date of Patent: Aug. 5, 2025

(54) RECEIVING DOWNLINK CONTROL INFORMATION THAT INDICATES CODEBOOK IDENTIFIERS

(71) Applicant: QUALCOMM Incorporated, San Diego, CA (US)

(72) Inventors: Konstantinos Dimou, New York City, NY (US); Yan Zhou, San Diego, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 458 days.

(21) Appl. No.: 17/816,948

(22) Filed: Aug. 2, 2022

(65) Prior Publication Data

US 2023/0043297 A1 Feb. 9, 2023

Related U.S. Application Data

(60) Provisional application No. 63/203,886, filed on Aug. 3, 2021.

(51) Int. Cl.
*H04L 1/18* (2023.01)
*H04L 1/1812* (2023.01)
*H04L 1/1829* (2023.01)

(52) U.S. Cl.
CPC .......... *H04L 1/1812* (2013.01); *H04L 1/1864* (2013.01)

(58) Field of Classification Search
CPC ... H04W 28/04; H04W 72/04; H04W 72/042; H04W 88/08; H04L 5/0007; H04L 1/1812; H04L 1/1864

USPC ......................................................... 370/329
See application file for complete search history.

(56) References Cited

U.S. PATENT DOCUMENTS

| 11,696,329 | B2 * | 7/2023 | Xu | H04L 1/187 |
| | | | | 370/329 |
| 2015/0131564 | A1 * | 5/2015 | Seo | H04W 72/21 |
| | | | | 370/329 |
| 2020/0213981 | A1 * | 7/2020 | Park | H04W 72/23 |
| 2021/0143943 | A1 * | 5/2021 | Zhou | H04L 5/001 |
| 2022/0346104 | A1 * | 10/2022 | Yi | H04W 72/56 |
| 2023/0096999 | A1 * | 3/2023 | Zhang | H04L 1/1887 |
| | | | | 370/329 |

(Continued)

OTHER PUBLICATIONS

3GPP TSG RAN WG1 #104-e, e-Meeting, Jan. 25-Feb. 5, 2021, R1-2101459, Agenda item: 8.3.1.1, Source: Qualcomm Incorporated, Title: HARQ-ACK enhancement for IOT and URLLC. (Year: 2021).*

(Continued)

*Primary Examiner* — Peter G Solinsky
*Assistant Examiner* — Sanjay K Dewan
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, downlink control information (DCI) that includes a request for a dropped hybrid automatic repeat request (HARQ) codebook, wherein the DCI indicates a codebook identifier (ID) associated with the dropped HARQ codebook. The UE may transmit, to the network node, the dropped HARQ codebook based at least in part on the codebook ID associated with the dropped HARQ codebook, as indicated in the DCI. Numerous other aspects are described.

30 Claims, 19 Drawing Sheets

(56) References Cited

U.S. PATENT DOCUMENTS

| | | | | |
|---|---|---|---|---|
| 2023/0098805 A1* | 3/2023 | Wang | ................... | H04W 72/20 370/329 |
| 2023/0100939 A1* | 3/2023 | Dimou | ................. | H04L 1/1861 370/329 |
| 2023/0318750 A1* | 10/2023 | Fu | ........................ | H04W 72/04 370/329 |
| 2024/0163912 A1* | 5/2024 | Khoshnevisan | ...... | H04L 5/0055 |

OTHER PUBLICATIONS

3GPP TSG RAN WG1 Meeting #98bis, Chongqing, CN, Oct. 14-Oct. 20, 2019, R1-1911099, Agenda Item: 7.2.2.2.3, Source: Qualcomm Incorporated, Title: Enhancements to Scheduling and HARQ operation for NR-U. (Year: 2019).*

3GPP TSG RAN WG1 #104b-e, e-Meeting, Apr. 12-20, 2021, R1-2103574, Source: NTT DOCOMO, Inc., Title: Discussion on HARQ-ACK feedback enhancements for Rel. 17 URLLC, Agenda Item: 8.3.1.1. (Year: 2021).*

3GPP TSG RAN WG1 #104b-e, e-Meeting, Apr. 12-20, 2021, R1-2102392, Source: OPPO, Title: HARQ-ACK enhancements for Rel-17 URLLC/IIoT, Agenda Item: 8.3.1.1. (Year: 2021).*

International Search Report and Written Opinion—PCT/US2022/074476—ISA/EPO—Nov. 18, 2022.

Qualcomm Incorporated: "Enhancements to Scheduling and HARQ Operation for NR-U", 3GPP TSG RAN WG1 Meeting #98bis, R1-1911099 7.2.2.2.3 Enhancements to Scheduling and HARQ Operation for NR-U, 3GPP, Mobile Competence Centre, 650, Route Des Lucioles, F-06921 Sophia—, vol. RAN WG1, No. Chongqing, CN, Oct. 14, 2019-Oct. 20, 2019, 17 Pages, Oct. 5, 2019, XP051808838, Section 2.3—Handling non-numeric value of K1, pp. 7, 8, figures 2,3,8, section 2.1.1.

Qualcomm Incorporated: "HARQ-ACK Enhancement for IOT and URLLC", 3GPP TSG RAN WG1 #104-e, R1-2101459, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, pp. 1-17, XP051971624, Section 5—Retransmission of dropped HARQ-ACK, pp. 1, 10, figures 1, 2, 8, 9, section 2, 5.

* cited by examiner

RECEIVING DOWNLINK CONTROL INFORMATION THAT INDICATES CODEBOOK IDENTIFIERS

CROSS-REFERENCE TO RELATED APPLICATION

This Patent Applications claims priority to U.S. Provisional Patent Application No. 63/203,886, filed on Aug. 3, 2021, entitled "RECEIVING DOWNLINK CONTROL INFORMATION THAT INDICATES CODEBOOK IDENTIFIERS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for receiving downlink control information (DCI) that indicates codebook identifiers (IDs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include memory, one or more processors coupled to the memory, and instructions stored in the memory and executable by the one or more processors. The instructions may be executable by the one or more processors to cause the UE to receive, from a network node, downlink control information (DCI) that includes a request for a dropped hybrid automatic repeat request (HARQ) codebook, wherein the DCI indicates a codebook identifier (ID) associated with the dropped HARQ codebook. The instructions may be executable by the one or more processors to cause the UE to transmit, to the network node, the dropped HARQ codebook based at least in part on the codebook ID associated with the dropped HARQ codebook, as indicated in the DCI.

Some aspects described herein relate to a network node for wireless communication. The network node may include memory, one or more processors coupled to the memory, and instructions stored in the memory and executable by the one or more processors. The instructions may be executable by the one or more processors to cause the network node to transmit, to a UE, DCI that includes a request for a dropped HARQ codebook, wherein the DCI indicates a codebook ID associated with the dropped HARQ codebook. The instructions may be executable by the one or more processors to cause the network node to receive, from the UE, the dropped HARQ codebook based at least in part on the codebook ID associated with the dropped HARQ codebook, as indicated in the DCI.

Some aspects described herein relate to a method of wireless communication performed by a UE. The method may include receiving, from a network node, DCI that includes a request for a dropped HARQ codebook, wherein the DCI indicates a codebook ID associated with the dropped HARQ codebook. The method may include transmitting, to the network node, the dropped HARQ codebook based at least in part on the codebook ID associated with the dropped HARQ codebook, as indicated in the DCI.

Some aspects described herein relate to a method of wireless communication performed by a network node. The method may include transmitting, to a UE, DCI that includes a request for a dropped HARQ codebook, wherein the DCI indicates a codebook ID associated with the dropped HARQ codebook. The method may include receiving, from the UE, the dropped HARQ codebook based at least in part on the codebook ID associated with the dropped HARQ codebook, as indicated in the DCI.

Some aspects described herein relate to a non-transitory computer-readable medium that stores one or more instructions for wireless communication by a UE. The one or more instructions, when executed by one or more processors of the UE, may cause the UE to receive, from a network node, DCI that includes a request for a dropped HARQ codebook, wherein the DCI indicates a codebook ID associated with the dropped HARQ codebook. The one or more instructions, when executed by one or more processors of the UE, may cause the UE to transmit, to the network node, the dropped HARQ codebook based at least in part on the codebook ID associated with the dropped HARQ codebook, as indicated in the DCI.

Some aspects described herein relate to a non-transitory computer-readable medium that stores one or more instructions for wireless communication by a network node. The one or more instructions, when executed by one or more processors of the network node, may cause the network node to transmit, to a UE, DCI that includes a request for a dropped HARQ codebook, wherein the DCI indicates a codebook ID associated with the dropped HARQ codebook. The one or more instructions, when executed by one or more processors of the network node, may cause the network node to receive, from the UE, the dropped HARQ codebook based at least in part on the codebook ID associated with the dropped HARQ codebook, as indicated in the DCI.

Some aspects described herein relate to an apparatus for wireless communication. The apparatus may include means for receiving, from a network node, DCI that includes a request for a dropped HARQ codebook, wherein the DCI indicates a codebook ID associated with the dropped HARQ codebook. The apparatus may include means for transmitting, to the network node, the dropped HARQ codebook based at least in part on the codebook ID associated with the dropped HARQ codebook, as indicated in the DCI.

Some aspects described herein relate to an apparatus for wireless communication. The apparatus may include means for transmitting, to a UE, DCI that includes a request for a dropped HARQ codebook, wherein the DCI indicates a codebook ID associated with the dropped HARQ codebook. The apparatus may include means for receiving, from the UE, the dropped HARQ codebook based at least in part on the codebook ID associated with the dropped HARQ codebook, as indicated in the DCI.

Aspects generally include a method, apparatus, system, computer program product, non-transitory computer-readable medium, user equipment, network node, network entity, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleaves, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
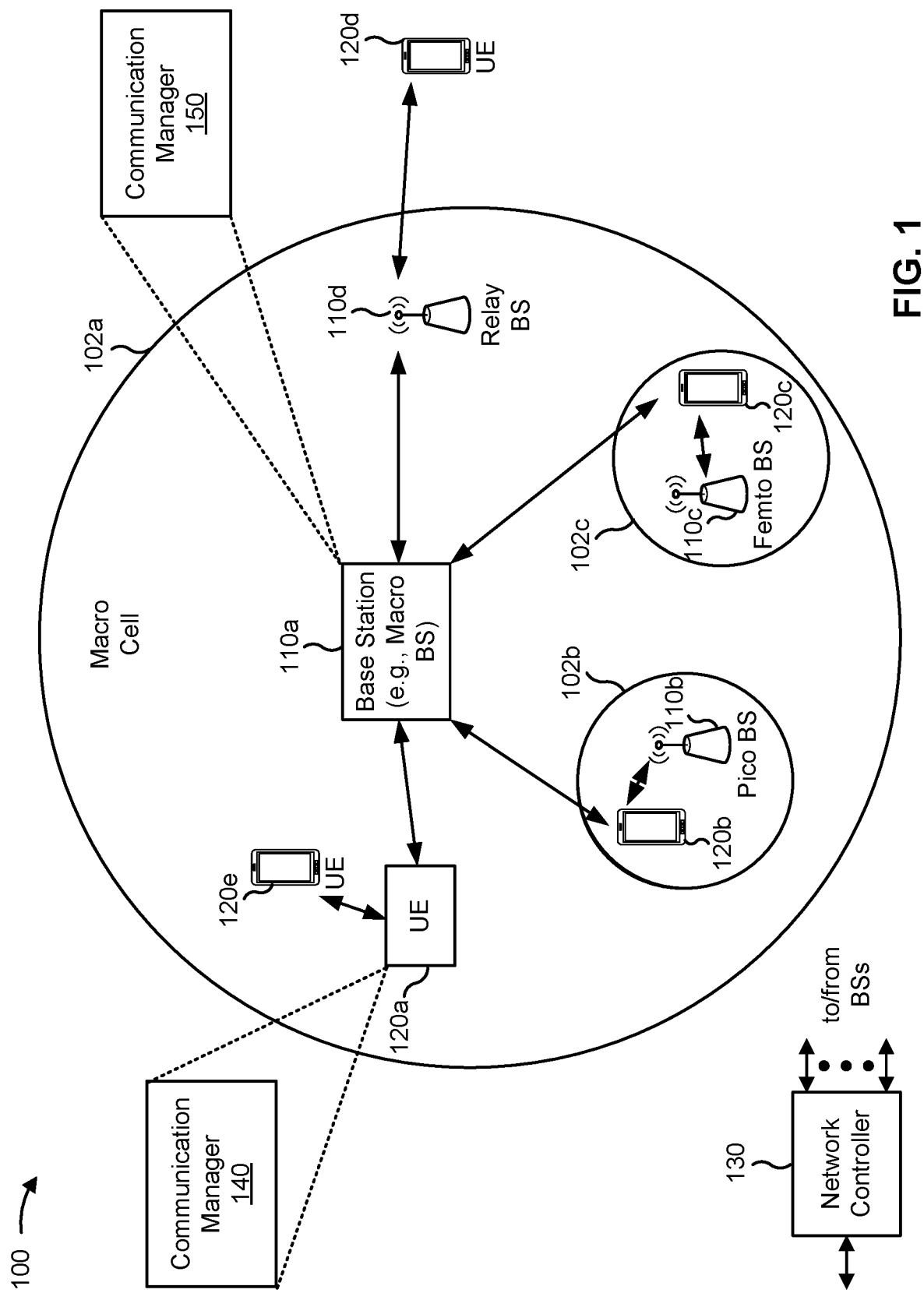
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network node" may refer to an aggregated base station, a disaggregated base station, an integrated access and backhaul (IAB) node, a relay node, and/or one or more components thereof. For example, in some aspects, "base station" or "network node" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the base station 110. In some aspects, the term "base station" or "network node" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations and/or one or more virtual base station functions. For example, in some aspects, two or more base station functions may be instantiated on a single device. In some aspects, the term "base station" or "network node" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network node, downlink control information (DCI) that includes a request for a dropped hybrid automatic repeat request (HARQ) codebook, wherein the DCI indicates a codebook identifier (ID) associated with the dropped HARQ codebook; and transmit, to the network node, the dropped HARQ codebook based at least in part on the codebook ID associated with the dropped HARQ codebook, as indicated in the DCI. Additionally, or alternatively, the communication manager 140 may perform one or more other operations described herein.

In some aspects, a network node (e.g., base station 110) may include a communication manager 150. As described in more detail elsewhere herein, the communication manager 150 may transmit, to a UE, DCI that includes a request for a dropped HARQ codebook, wherein the DCI indicates a codebook ID associated with the dropped HARQ codebook; and receive, from the UE, the dropped HARQ codebook based at least in part on the codebook ID associated with the dropped HARQ codebook, as indicated in the DCI. Additionally, or alternatively, the communication manager 150 may perform one or more other operations described herein.

As indicated above, FIG. 1 is provided as an example. Other examples may differ from what is described with regard to FIG. 1.

Figure 2:
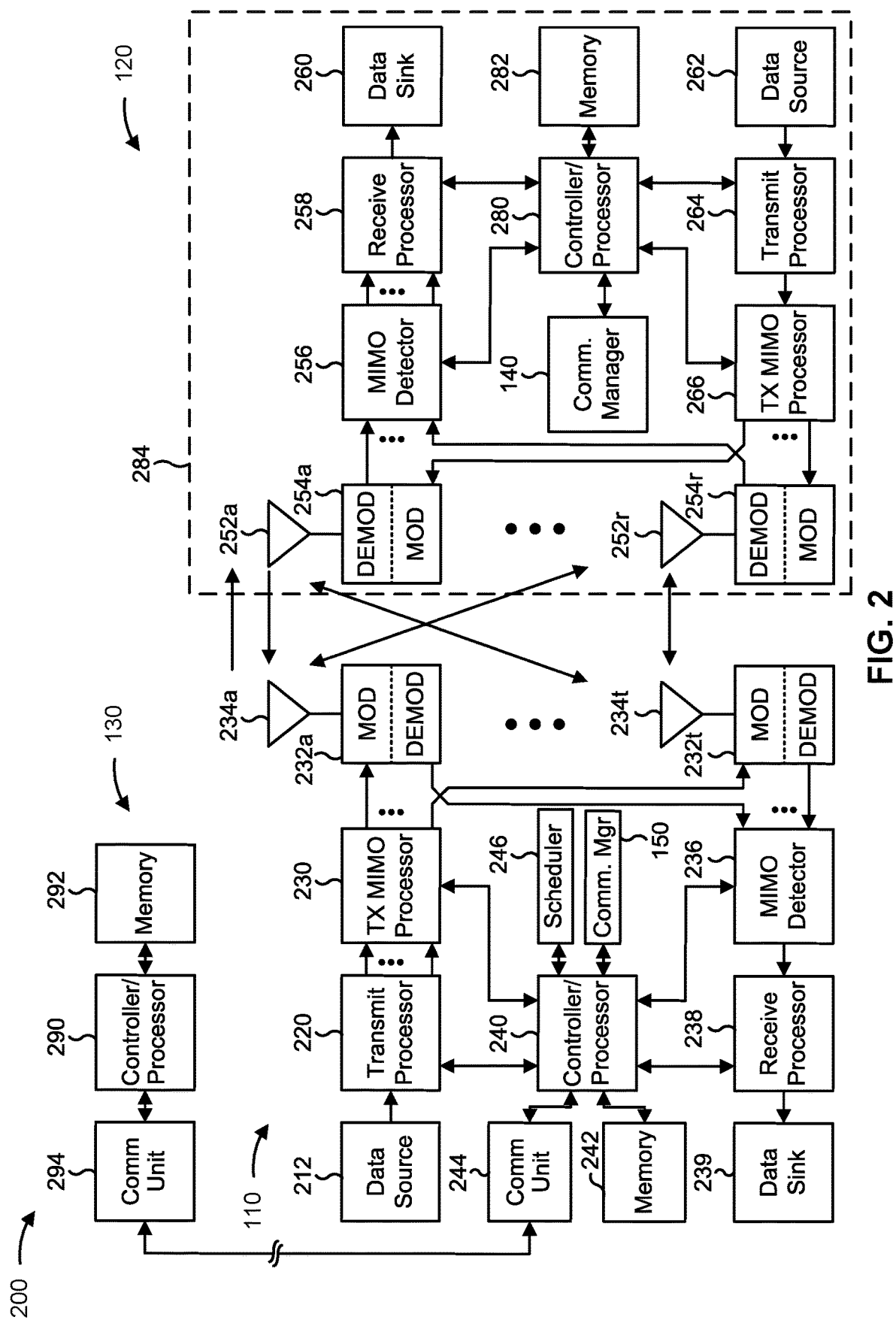
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, May provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 9-16).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 9-16).

The controller/processor 240 of the base station 110, the controller/processor 280 of the UE 120, and/or any other component(s) of FIG. 2 may perform one or more techniques associated with receiving DCI that indicates codebook IDs, as described in more detail elsewhere herein. For example, the controller/processor 240 of the base station 110, the controller/processor 280 of the UE 120, and/or any other component(s) of FIG. 2 may perform or direct operations of, for example, process 1500 of FIG. 15, process 1600 of FIG. 16, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1500 of FIG. 15, process 1600 of FIG. 16, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network node, DCI that includes a request for a dropped HARQ codebook, wherein the DCI indicates a codebook ID associated with the dropped HARQ codebook; and/or means for transmitting, to the network node, the dropped HARQ codebook based at least in part on the codebook ID associated with the dropped HARQ codebook, as indicated in the DCI. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., base station 110) includes means for transmitting, to a UE, DCI that includes a request for a dropped HARQ codebook, wherein the DCI indicates a codebook ID associated with the dropped HARQ codebook; and/or means for receiving, from the UE, the dropped HARQ codebook based at least in part on the codebook ID associated with the dropped HARQ codebook, as indicated in the DCI. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A canceled HARQ (or dropped HARQ) may be associated with a semi-persistent scheduling (SPS) physical uplink control channel (PUCCH) HARQ colliding with downlink or flexible symbols. A canceled HARQ may be associated with a HARQ dropped due to intra-UE multiplexing. A canceled HARQ may be associated with a HARQ multiplexed with a physical uplink shared channel (PUSCH), and the PUSCH may be canceled via a cancelation indication in a downlink control information (DCI) format 2_4.

Figure 3:
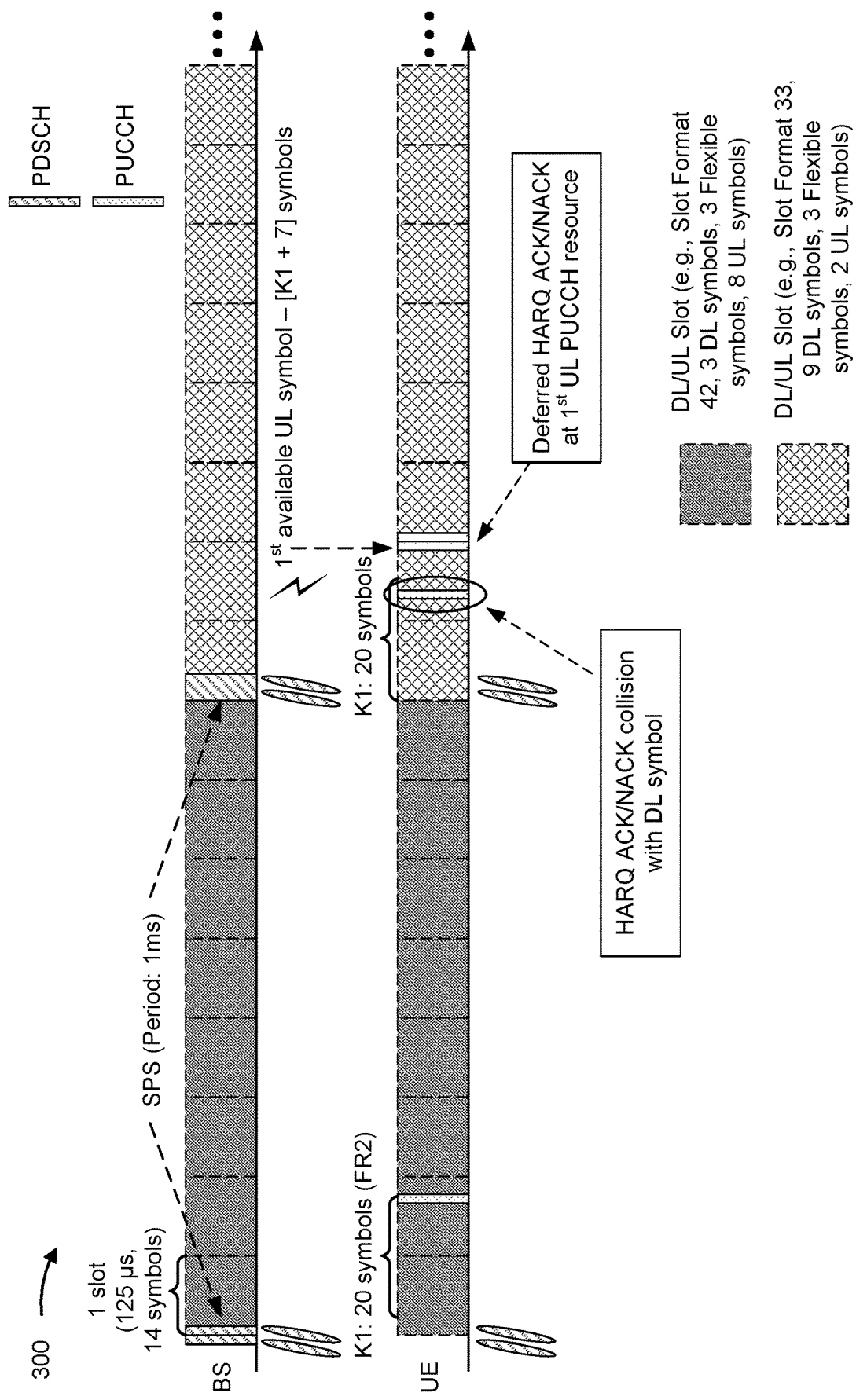
FIG. 3 is a diagram illustrating an example of a hybrid automatic repeat request (HARQ) acknowledgement (ACK)/negative acknowledgement (NACK) collision with a downlink symbol, in accordance with the present disclosure.

FIG. 3 is a diagram illustrating an example 300 of a HARQ ACK/NACK collision with a downlink symbol, in accordance with the present disclosure.

A network node (e.g., base station 110) may transmit, to a UE (e.g., UE 120), an SPS via a physical downlink shared channel (PDSCH) in a slot. The slot may be associated with a first type. The UE may transmit, to the network node, a HARQ ACK/NACK based at least in part on a K1 value, which may indicate a quantity of symbols (e.g., 20 symbols). For example, the UE may transmit the HARQ ACK/NACK in a next slot based at least in part on the K1 value. The UE may transmit the HARQ ACK/NACK via a PUCCH.

In some cases, a slot format may change from the first type to a second type, and a network node may transmit, to a UE, an SPS via a PDSCH in a slot associated with the second type. A HARQ ACK/NACK (which may include one or more bits) associated with the SPS may collide with a downlink symbol based at least in part on a K1 value. In this case, the HARQ ACK/NACK may be deferred to a first available uplink symbol (e.g., a first available PUCCH resource). For example, the deferred HARQ ACK/NACK may be transmitted at K1+7 symbols (e.g., 27 symbols after the SPS is transmitted via the PDSCH in the slot.

As indicated above, FIG. 3 is provided as an example. Other examples may differ from what is described with regard to FIG. 3.

Figure 4:
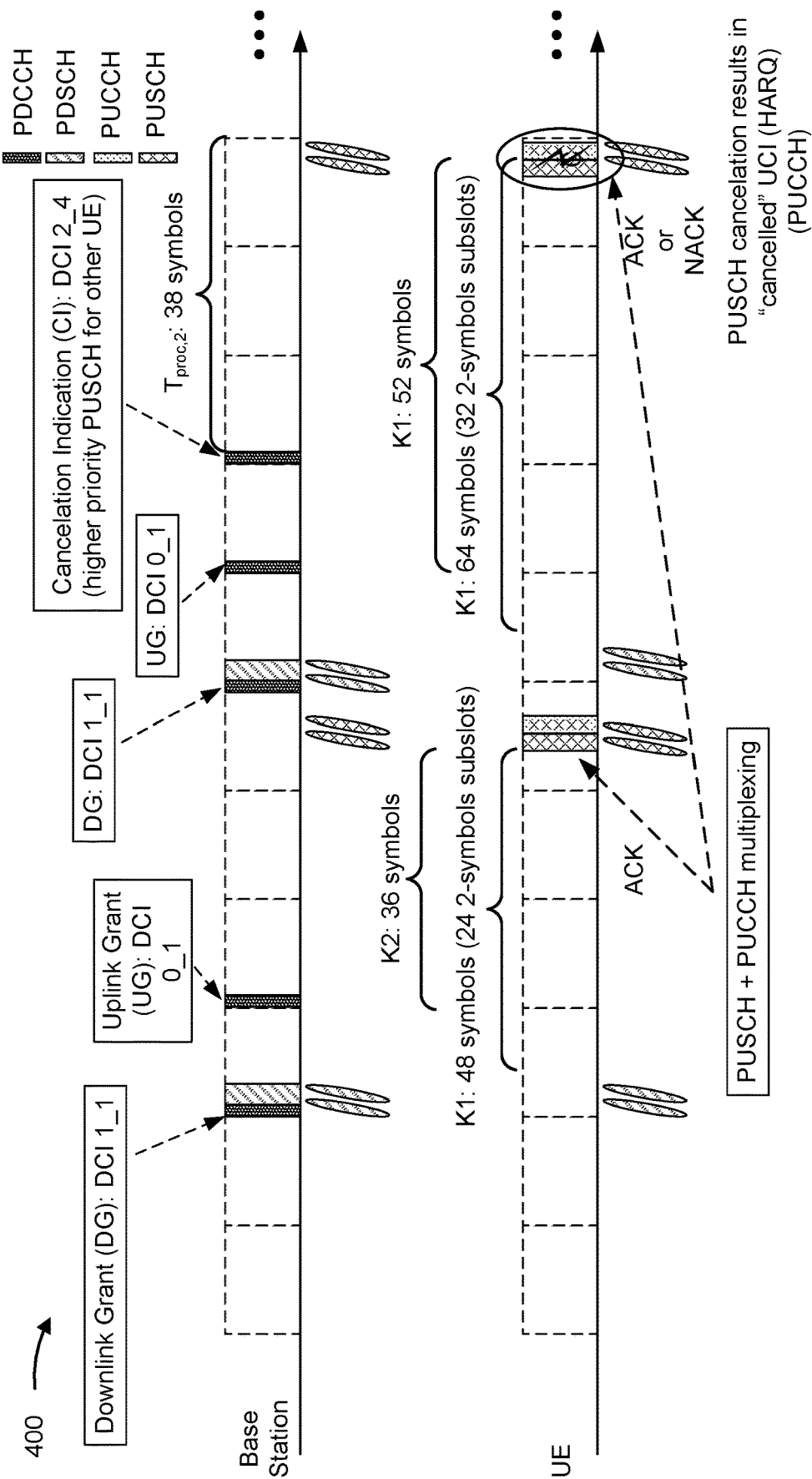
FIG. 4 is a diagram illustrating an example of a dropped physical uplink control channel (PUCCH) based at least in part on a cancelation indication, in accordance with the present disclosure.

FIG. 4 is a diagram illustrating an example 400 of a dropped PUCCH based at least in part on a cancelation indication, in accordance with the present disclosure.

A network node (e.g., base station 110) may transmit, to a UE (e.g., UE 120), a downlink grant in DCI (e.g., DCI format 1_1) via a physical downlink control channel (PDCCH). The downlink grant may indicate resources for a PDSCH transmission. The network node may transmit, to the UE, an uplink grant in DCI (e.g., DCI format 0_1) via a PDCCH. The UE may perform a PUSCH transmission based at least in part on the uplink grant, where the PUSCH transmission may be K2 symbols (e.g., 36 symbols) after the uplink grant. The UE may perform a PUCCH transmission containing a HARQ ACK/NACK based at least in part on the PDSCH transmission, where the PUCCH transmission may be K1 symbols (e.g., 48 symbols) after the PDSCH transmission. The UE may multiplex the PUSCH transmission and the PUCCH transmission. In other words, the UE may perform a PUSCH and PUCCH multiplexing using uplink symbol(s).

At a later time, the network node may transmit, to the UE, a second downlink grant in DCI via a second PDCCH. The second downlink grant may indicate resources for a second PDSCH transmission. The network node may transmit, to the UE, a second uplink grant in DCI via a second PDCCH. The network node may transmit, to the UE, a cancelation indication in DCI (e.g., DCI format 2_4) based at least in part on a higher priority PUSCH for another UE. The UE may cancel, based at least in part on the cancelation indication, a second PUSCH transmission based at least in part on the second uplink grant. As a result, a second PUCCH transmission containing a HARQ ACK/NACK based at least in part on the second PDSCH transmission may be canceled. The second PUCCH transmission containing the HARQ ACK/NACK for the second PDSCH transmission may be dropped and not transmitted to the network node, based at least in part on the cancellation indication that cancels the second PUSCH transmission.

As indicated above, FIG. 4 is provided as an example. Other examples may differ from what is described with regard to FIG. 4.

Figure 5:
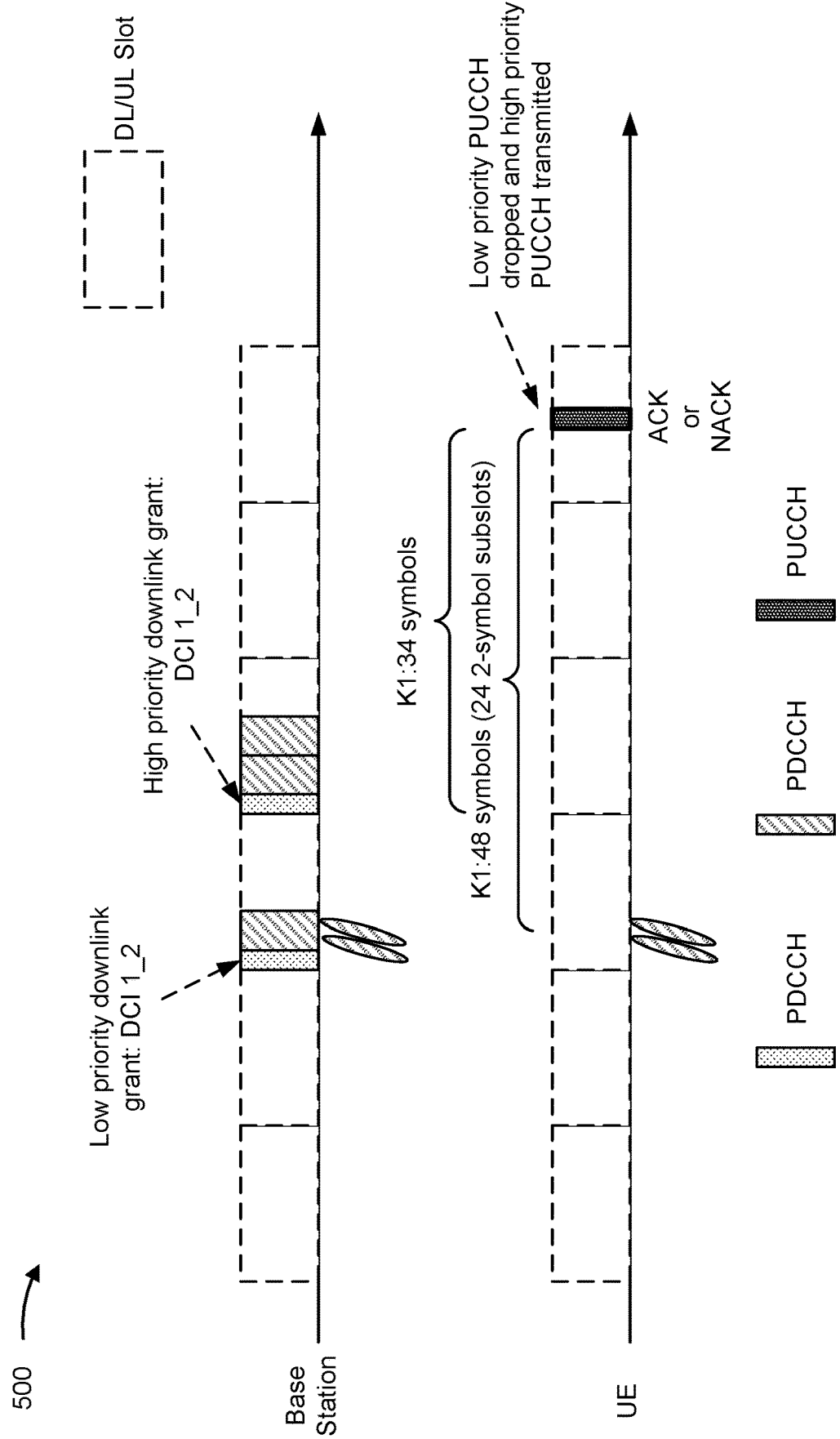
FIG. 5 is a diagram illustrating an example of dropping an uplink transmission associated with a low priority based at least in part on an uplink transmission associated with a high priority, in accordance with the present disclosure.

FIG. 5 is a diagram illustrating an example 500 of dropping an uplink transmission associated with a low priority based at least in part on an uplink transmission associated with a high priority, in accordance with the present disclosure.

A network node (e.g., base station 110) may transmit, to a UE (e.g., UE 120), a first downlink grant associated with a low priority. The first downlink grant associated with the low priority may be transmitted in first DCI (e.g., DCI format 1_2) over a first PDCCH. The first downlink grant associated with the low priority may schedule a first PDSCH transmission associated with the low priority. At a later time (e.g., in a next slot), the network node may transmit, to the UE, a second downlink grant associated with a high priority. The high priority may be higher than the low priority. The second downlink grant associated with the high priority may be transmitted in second DCI (e.g., DCI format 1_2) over a second PDCCH. The second downlink grant associated with the high priority may schedule a second PDSCH transmission associated with the high priority.

The first downlink grant associated with the low priority may allocate resources for a first PUCCH transmission associated with the first PDSCH transmission. The first PUCCH transmission may indicate HARQ ACK/NACK feedback based at least in part on the first PDSCH transmission. The first PDSCH transmission and the first PUCCH transmission may be separated by a first quantity of symbols. The first quantity of symbols (e.g., K1 symbols) may be greater than a minimum symbol value plus a one-slot symbol value. Further, the second downlink grant associated with the high priority may allocate resources for a second PUCCH transmission associated with the second PDSCH transmission. The second PUCCH transmission may indicate HARQ ACK/NACK feedback based at least in part on the second PDSCH transmission. The second PDSCH transmission and the second PUCCH transmission may be separated by a second quantity of symbols. The second quantity of symbols (e.g., K1 symbols) may be greater than a minimum symbol value plus a one-slot symbol value. The first quantity of symbols may be different than the second quantity of symbols.

The resources allocated for the first PUCCH transmission may collide with the resources allocated for the second PUCCH transmission. The resources allocated for the second PUCCH transmission associated with the high priority may overwrite the resources allocated for the first PUCCH transmission associated with the low priority, and the resources allocated for the second PUCCH transmission associated with the high priority may not be sufficient to convey both the first PUCCH transmission and the second PUCCH transmission. A multiplexing of the first PUCCH transmission and the second PUCCH transmission may not be possible using the resources. In this case, the UE may drop the first PUCCH transmission associated with the low priority and the UE may transmit the second PUCCH transmission associated with the high priority using the resources, since the high priority may be higher than the low priority. In other words, the UE may drop the first PUCCH transmission that is a low priority and the UE may transmit the second PUCCH transmission that is a high priority.

As an example, a K1 value associated with the first PDSCH transmission may be 48 symbols. A K1 value associated with the second PDSCH transmission, which may occur one slot after the first PDSCH transmission, may be 34 symbols. As a result, the resources allocated for the first PUCCH transmission may collide with the resources allocated for the second PUCCH transmission. The K1 value associated with the first PDSCH transmission and the first PUCCH transmission may indicate a first PDSCH-to-HARQ-timing, and the K/value associated with the second PDSCH transmission and the second PUCCH transmission may indicate a second PDSCH-to-HARQ-timing.

As indicated above, FIG. 5 is provided as an example. Other examples may differ from what is described with regard to FIG. 5.

At least one enhanced Type 3 HARQ-ACK codebook with a reduced size, as compared to previous Type 3 HARQ-ACK codebooks, may be supported for a HARQ-ACK retransmission. A codebook size of a single triggered enhanced Type 3 HARQ-ACK codebook may be based at least in part on a radio resource control (RRC) configuration. A codebook construction may use HARQ processes as a basis. For example, the enhanced Type 3 HARQ-ACK codebook may be ordered according to HARQ identifiers (IDs) and serving cells. One shot triggering of a HARQ-ACK retransmission may be supported on a PUCCH resource, other than an enhanced Type 2 or (enhanced) Type 3 HARQ-ACK codebook. The one shot triggering may occur by a downlink assignment. The enhanced Type 3 HARQ-ACK codebook and/or the one-shot triggering (by the downlink assignment) of the HARQ-ACK re-transmission on the PUCCH resource other than the enhanced Type 2 or (enhanced) Type 3 HARQ-ACK CB may be subject to separate UE capabilities.

During an SPS HARQ collision with downlink symbols, a dropped PUCCH due to a cancelation indication, and a dropped low priority PUCCH transmission due to a high priority PUCCH transmission, at least one codebook may be prepared for transmission, and the at least one codebook may be delayed or deferred to a later slot (or sub-slot). In the case of more than one codebook, codebooks may need to be concatenated.

Figure 6:
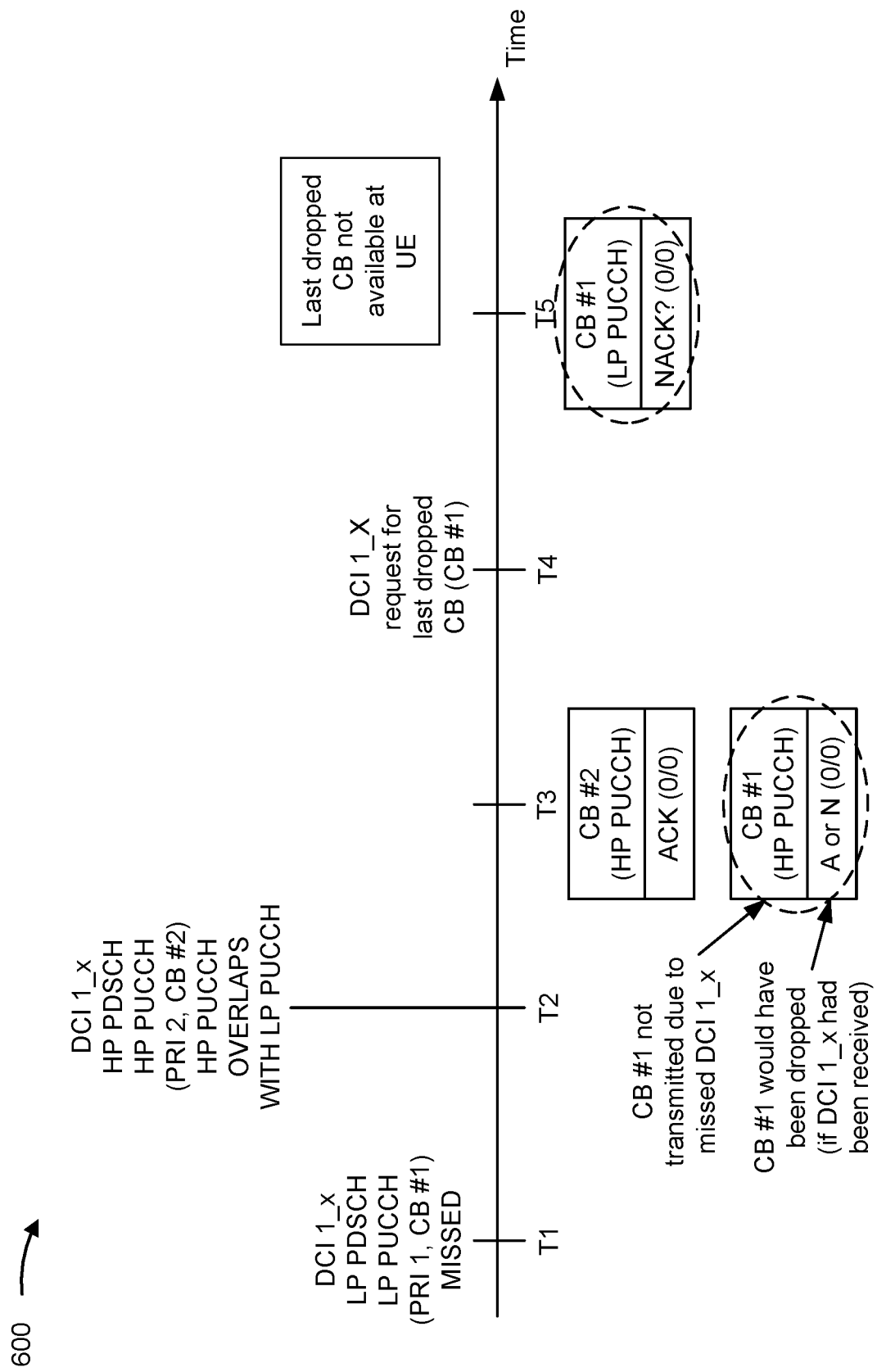
FIG. 6 is a diagram illustrating an example of a last dropped codebook not being available, in accordance with the present disclosure.

FIG. 6 is a diagram illustrating an example 600 of a last dropped codebook not being available, in accordance with the present disclosure.

At a first time point (T1), a UE (e.g., UE 120) may miss a first DCI (e.g., DCI format 1_x) associated with a low priority PDSCH transmission and a low priority PUCCH transmission. In other words, the UE may not receive the first DCI from a network node (e.g., base station 110). The first DCI may be associated with a first PUCCH resource indicator (PRI) and a first codebook. At a second time point (T2), the UE may receive from the network node a second DCI (e.g., DCI format 1_x) associated with a high priority PDSCH transmission and a high priority PUCCH transmission. The second DCI may be associated with a second PRI and a second codebook. The high priority PUCCH transmission may overlap with the low priority PUCCH transmission. At a third time point (T3), the UE may perform a high priority PUCCH transmission, which may be associated with the high priority PDSCH transmission. The high priority PUCCH transmission may be associated with the second codebook. The UE may not transmit the first codebook associated with the low priority PDSCH transmission due to the first DCI that was missed at the UE. The UE may still would have dropped the first codebook, even if the first DCI was received, since the second codebook is associated with a higher priority as compared to the first codebook.

At a fourth time point (T4), the UE may receive, from the network node, a request in DCI (e.g., DCI format 1_x) for a last dropped codebook, such as the first codebook. At a fifth time point (T5), the last dropped codebook may not be available at the UE. The last dropped codebook may not be available since the UE did not receive the first DCI associated with the first codebook. In the case of a missed DCI (e.g., scheduling a low priority PDSCH transmission and a low priority PUCCH transmission being canceled), a requested transmission (or retransmission) of a canceled HARQ may not be available. The canceled HARQ may be associated with the first codebook.

As indicated above, FIG. 6 is provided as an example. Other examples may differ from what is described with regard to FIG. 6.

Figure 7:
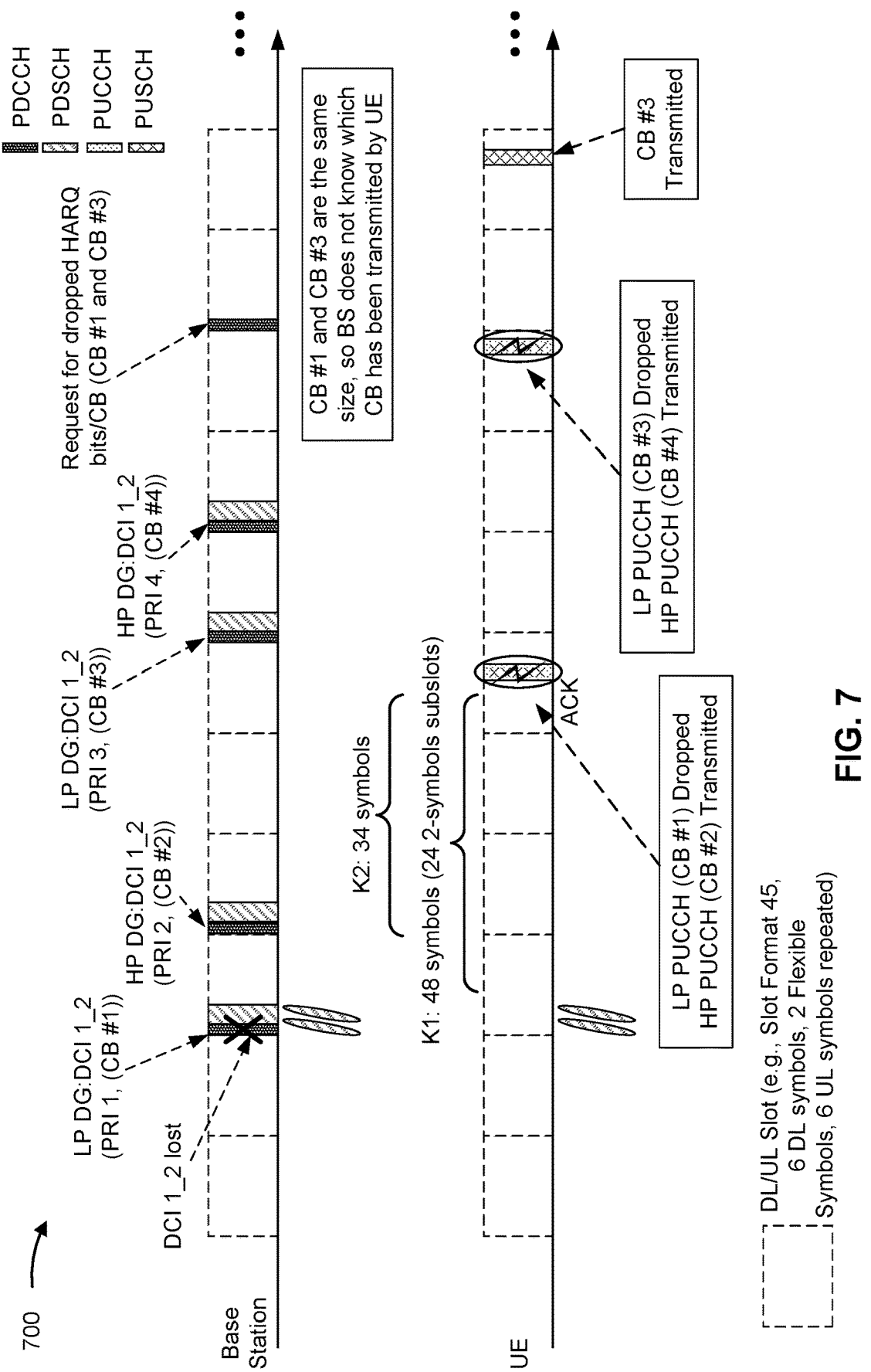
FIG. 7 is a diagram illustrating an example of consecutive dropped codebooks, in accordance with the present disclosure.

FIG. 7 is a diagram illustrating an example 700 of consecutive dropped codebooks, in accordance with the present disclosure.

A UE (e.g., UE 120) may miss a first DCI (e.g., DCI format 1_2) transmitted by a network node (e.g., base station 110) via a PDCCH. The first DCI may be associated with a low priority downlink grant. The first DCI may be associated with a first PRI and a first codebook. At a later time, the UE may receive a second DCI (e.g., DCI format 1_2) transmitted by the network node. The second DCI may be associated with a high priority downlink grant. The second DCI may be associated with a second PRI and a second codebook. A high priority PUCCH transmission associated with the second DCI may conflict with a low priority PUCCH transmission associated with the first DCI, and a multiplexing of the high priority PUCCH transmission and the low priority PUCCH transmission may not be possible. The UE may perform the high priority PUCCH transmission associated with the second codebook, and the UE may drop the low priority PUCCH transmission associated with the first codebook.

The UE may receive a third DCI (e.g., DCI format 1_2) associated with a low priority downlink grant. The third DCI may be associated with a third PRI and a third codebook. Further, the UE may receive a fourth DCI (e.g., DCI format 1_2) associated with a high priority downlink grant. The fourth DCI may be associated with a fourth PRI and a fourth codebook. A high priority PUCCH transmission associated with the fourth DCI may conflict with a low priority PUCCH transmission associated with the third DCI. The UE may perform the high priority PUCCH transmission associated with the fourth codebook, and the UE may drop the low priority PUCCH transmission associated with the third codebook.

The UE may receive, from the network node, a request for dropped HARQ codebooks. In this case, the dropped HARQ codebooks may be the first codebook and the third codebook. Since the UE did not receive the first DCI (e.g., the missed DCI) from the network node, the UE cannot transmit the first codebook in response to the request for dropped HARQ codebooks received from the network node. The UE may transmit the third codebook only and not the first codebook. However, the network node may be unable to determine whether a codebook received from the UE is the first codebook or the third codebook, since both codebooks may be associated with a same size. In other words, the network node may be unable to determine which of the two dropped codebooks (e.g., the first codebook and the second codebook) has been transmitted by the UE in response to the request for dropped HARQ codebooks.

As indicated above, FIG. 7 is provided as an example. Other examples may differ from what is described with regard to FIG. 7.

Figure 8:
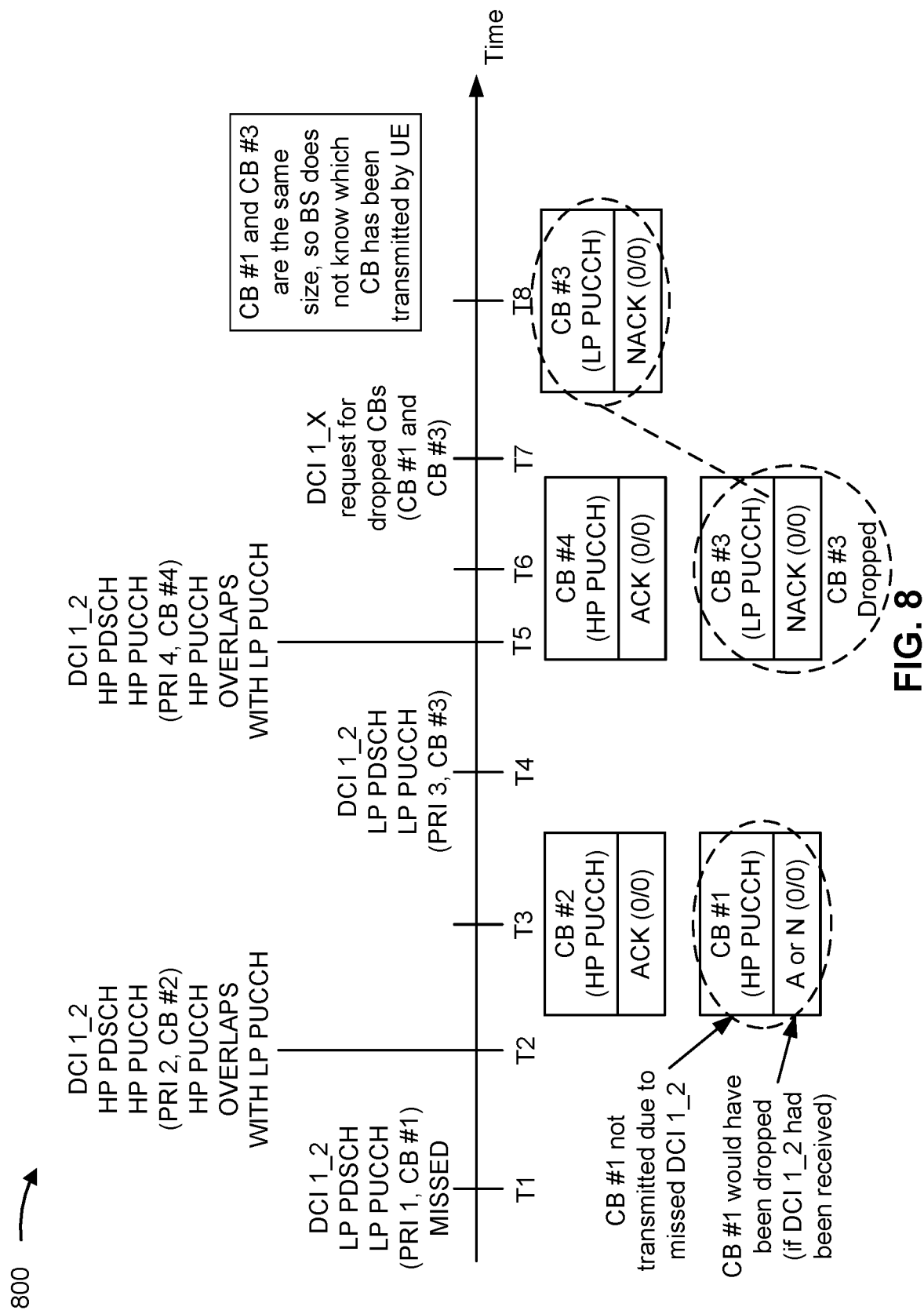
FIG. 8 is a diagram illustrating an example of consecutive dropped codebooks, in accordance with the present disclosure.

FIG. 8 is a diagram illustrating an example 800 of consecutive dropped codebooks, in accordance with the present disclosure.

At a first time point (T1), a UE (e.g., UE 120) may miss a first DCI (e.g., DCI format 1_2) associated with a low priority PDSCH transmission and a low priority PUCCH transmission. In other words, the UE may not receive the first DCI from a network node (e.g., base station 110). The first DCI may be associated with a first PUCCH resource indicator (PRI) and a first codebook. At a second time point (T2), the UE may receive from the network node a second DCI (e.g., DCI format 1_2) associated with a high priority PDSCH transmission and a high priority PUCCH transmission. The second DCI may be associated with a second PRI and a second codebook. The high priority PUCCH transmission may overlap with the low priority PUCCH transmission. At a third time point (T3), the UE may perform a high priority PUCCH transmission, which may be associated with the high priority PDSCH transmission. The high priority PUCCH transmission may be associated with the second codebook. The UE may not transmit the first codebook associated with the low priority PDSCH transmission due to the first DCI that was missed at the UE. The UE may still would have dropped the first codebook, even if the first DCI was received, since the second codebook is associated with a higher priority as compared to the first codebook.

At a fourth time point (T4), the UE may receive from the network node a third DCI (e.g., DCI format 1_2) associated with a low priority PDSCH transmission and a low priority PUCCH transmission. The third DCI may be associated with a third PRI and a third codebook. At a fifth time point (T5), the UE may receive from the network node a fourth DCI (e.g., DCI format 1_2) associated with a high priority PDSCH transmission and a high priority PUCCH transmission. The fourth DCI may be associated with a fourth PRI and a fourth codebook. The high priority PUCCH transmission may overlap with the low priority PUCCH transmission. At a sixth time point (T6), the UE may perform a high priority PUCCH transmission, which may be associated with the high priority PDSCH transmission. The high priority PUCCH transmission may be associated with the fourth codebook. The UE may not transmit the third codebook associated with the low priority PDSCH transmission, since the third codebook is associated with a lower priority as compared to the fourth codebook.

At a seventh time point (T7), the UE may receive from the network node a request in DCI (e.g., DCI format 1_x) for dropped HARQ codebooks. In this case, the dropped HARQ codebooks may be the first codebook and the third codebook. Since the UE did not receive the first DCI (e.g., the missed DCI) from the network node, the UE cannot transmit the first codebook in response to the request for dropped HARQ codebooks received from the network node. At an eighth time point (T8), the UE may transmit the third codebook only and not the first codebook. However, the network node may be unable to determine whether a codebook received from the UE is the first codebook or the third codebook, since both codebooks may be associated with a same size. In other words, the network node may be unable to determine which of the two dropped codebooks (e.g., the first codebook and the second codebook) has been transmitted by the UE in response to the request for dropped HARQ codebooks.

As indicated above, FIG. 8 is provided as an example. Other examples may differ from what is described with regard to FIG. 8.

In some cases, a UE may miss a DCI transmitted by a network node (e.g., a missed DCI may not be received at the UE), and as a result, a HARQ codebook associated with the missed DCI may be dropped (or canceled) at the UE. In other words, a dropped HARQ codebook may be associated with the missed DCI. Further, the UE may drop a HARQ codebook associated with a low priority PUCCH transmission based at least in part on a conflict with a high priority PUCCH transmission. The UE may receive, from a network node, a request for a last dropped HARQ codebook. Since the UE did not receive the DCI, the UE may be unable to transmit the dropped HARQ codebook associated with the missed DCI. In this example, the UE may transmit a dropped HARQ codebook associated with the low priority PUCCH transmission. However, the network node receiving the dropped HARQ codebook may be unable to determine whether the dropped HARQ codebook received from the UE is associated with the missed DCI or whether the dropped HARQ codebook received from the UE is associated with the low priority PUCCH transmission.

In various aspects of techniques and apparatuses described herein, the UE may receive, from the network node, DCI that includes a request for a dropped HARQ codebook, where the DCI indicates a codebook ID associated with the dropped HARQ codebook. The UE may transmit, to the network node, the dropped HARQ codebook based at least in part on the codebook ID associated with the dropped HARQ codebook, as indicated in the DCI. In some aspects, the codebook ID (or HARQ codebook ID) may be added at each DCI, which may enable the UE to respond to requests for dropped HARQ codebooks. For example, DCIs associated with missed DCIs, low priority PUCCH transmissions, high priority PUCCH transmissions, and so on may each indicate a corresponding codebook ID. As a result, when the network node receives a transmission (or retransmission) of the dropped HARQ codebook, the network node may be able to associate a certain DCI with the dropped HARQ codebook.

In some aspects, dropped HARQ codebooks may also be referred to as dropped HARQ bits, canceled HARQ codebooks, or HARQ codebooks that collide with a downlink.

In some aspects, for multiple component carriers (CCs), a unique numbering scheme may be used to number the codebook IDs. For example, a codebook ID #0 may be associated with a first CC (CC0), a codebook ID #1 may be associated with a second CC (CC1), and so on. Alternatively, for multiple CCs, a numbering scheme may be per CC. In this case, a codebook ID and a CC number may be used to distinguish between different codebooks.

In some aspects, in response to a request for dropped HARQ codebooks, the UE may add codebook IDs to uplink control information (UCI) including HARQ transmissions. In some aspects, a codebook ID may be a DCI field of three or four bits, such that up to 16 codebooks may be requested. In some aspects, a codebook concatenation order may be associated with an implicit ordering, such as a lower CC, a lower HARQ codebook ID, and so on. Alternatively, a codebook concatenation order may be associated with an explicit ordering, which may correspond to an indicated individual codebook order as requested by the DCI.

Figure 9:
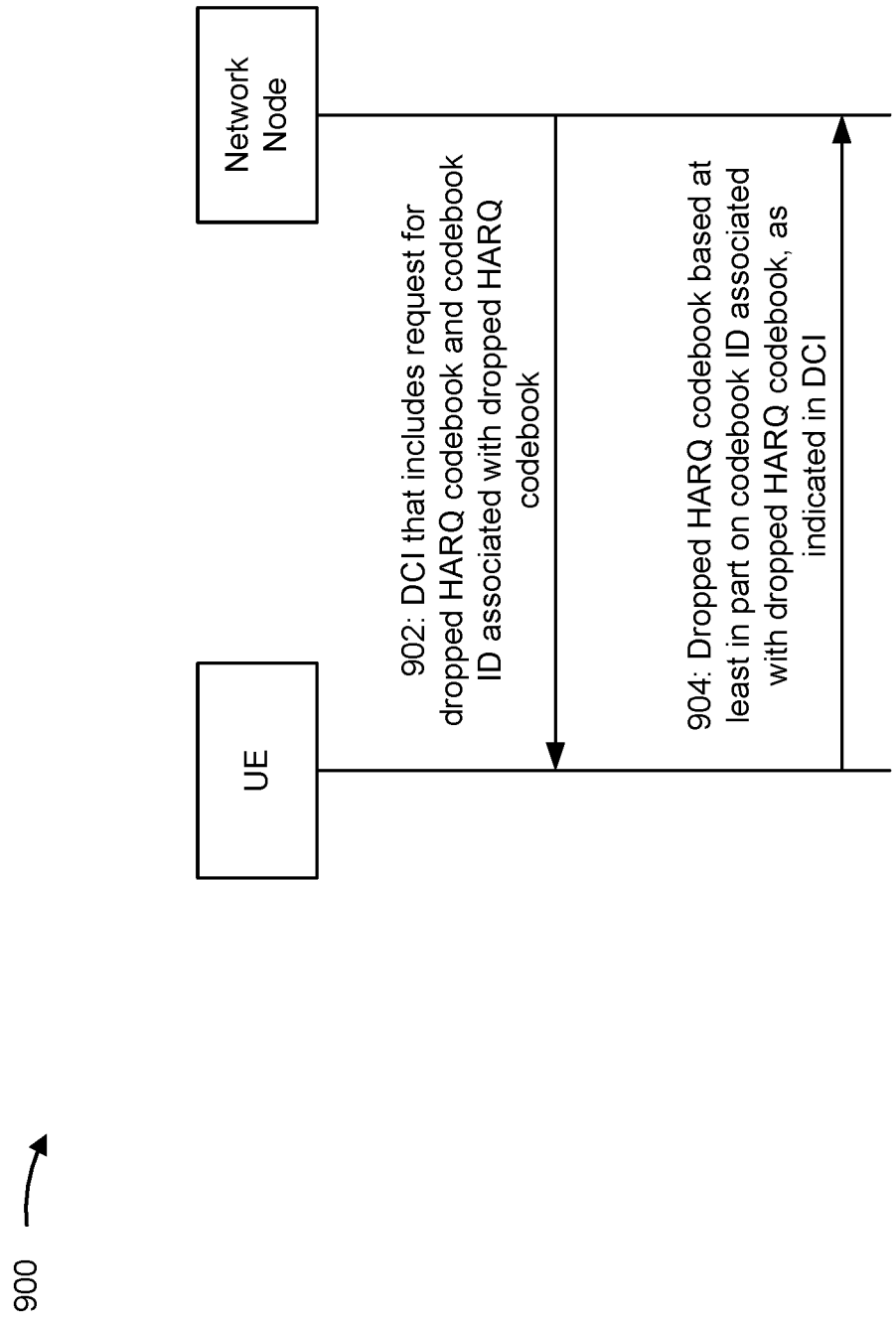
FIGS. 9-14 are diagrams illustrating examples associated with receiving downlink control information (DCI) that indicates codebook identifiers (IDs), in accordance with the present disclosure.

FIG. 9 is a diagram illustrating an example 900 associated with receiving DCI that indicates codebook IDs, in accordance with the present disclosure. As shown in FIG. 9, example 900 includes communication between a UE (e.g., UE 120) and a network node (e.g., base station 110). In some aspects, the UE and the network node may be included in a wireless network, such as wireless network 100.

As shown by reference number 902, the UE may receive, from the network node, DCI that includes a request for a dropped HARQ codebook. The DCI may indicate a codebook ID associated with the dropped HARQ codebook. In some aspects, the codebook ID may be a DCI field that supports a request of up to 16 dropped HARQ codebooks. In some aspects, the DCI may indicate a codebook number associated with the dropped HARQ codebook, a codebook range per CC, and/or a codebook range common to a plurality of CCs. The codebook number may be associated with an implicit codebook concatenation order or an explicit codebook concatenation order based at least in part on the request included in the DCI.

In some aspects, the DCI may indicate a request for the dropped HARQ codebook, a PRI or a PUSCH associated with a transmission of the dropped HARQ codebook, and/or a quantity of NACK bits per dropped HARQ codebook. The request for the dropped HARQ codebook may indicate that the DCI is not for scheduling a PUSCH and is for requesting the dropped HARQ codebook. In some aspects, the DCI may be associated with HARQ codebooks for a downlink grant PDSCH transmission, or the DCI may be associated with HARQ codebooks for an SPS PDSCH transmission.

In some aspects, the dropped HARQ codebook may be associated with a missed DCI, and the missed DCI may indicate the codebook ID. In some aspects, the dropped HARQ codebook may be associated with a low priority PUCCH transmission that conflicts with a high priority PUCCH transmission. The low priority PUCCH transmission may be associated with a low priority PDSCH transmission (e.g., DCI) that indicates the codebook ID.

As shown by reference number 904, the UE may transmit, to the network node, the dropped HARQ codebook based at least in part on the codebook ID associated with the dropped HARQ codebook, as indicated in the DCI. In some aspects, the dropped HARQ codebook may be associated with the missed DCI and the codebook ID indicated by the missed DCI may not be available at the UE. The UE may transmit, to the network node, available HARQ codebooks associated with codebook IDs available at the UE. The available HARQ codebooks may be concatenated in a PUCCH based at least in part on an order indicated in the DCI, and the UE may be configured to perform no HARQ codebook transmission for a single dropped HARQ codebook. In some aspects, the UE may transmit, to the network node, a negative acknowledgement for each non-available HARQ codebook. In some aspects, the DCI may indicate a quantity of NACK bits associated with the dropped HARQ codebook, and the quantity of NACK bits may indicate a requested codebook length due to the missed DCI. In some aspects, the UE may transmit one bit for the dropped HARQ codebook, where the one bit may correspond to a logical AND operation of a plurality of HARQ bits associated with the dropped HARQ codebook.

In some aspects, the DCI may indicate an SPS PUCCH ID associated with the dropped HARQ codebook. The DCI indicating the SPS PUCCH ID may indicate a PRI associated with transmitting the dropped HARQ codebook. In some aspects, the SPS PUCCH numbering may be applicable based at least in part on an SPS PUCCH HARQ not multiplexed with HARQ feedback corresponding to a downlink grant PDSCH. The SPS PUCCH numbering may be applicable based at least in part on the SPS PUCCH HARQ being multiplexed with UCI corresponding to the downlink grant PDSCH. The SPS PUCCH numbering may be a unique SPS PUCCH numbering based at least in part on a plurality of CCs. In some aspects, the DCI may indicate the codebook ID or the SPS PUCCH numbering, the UCI may indicate the codebook ID, or an SPS PUCCH may indicate the SPS PUCCH ID.

As indicated above, FIG. 9 is provided as an example. Other examples may differ from what is described with regard to FIG. 9.

Figure 10:
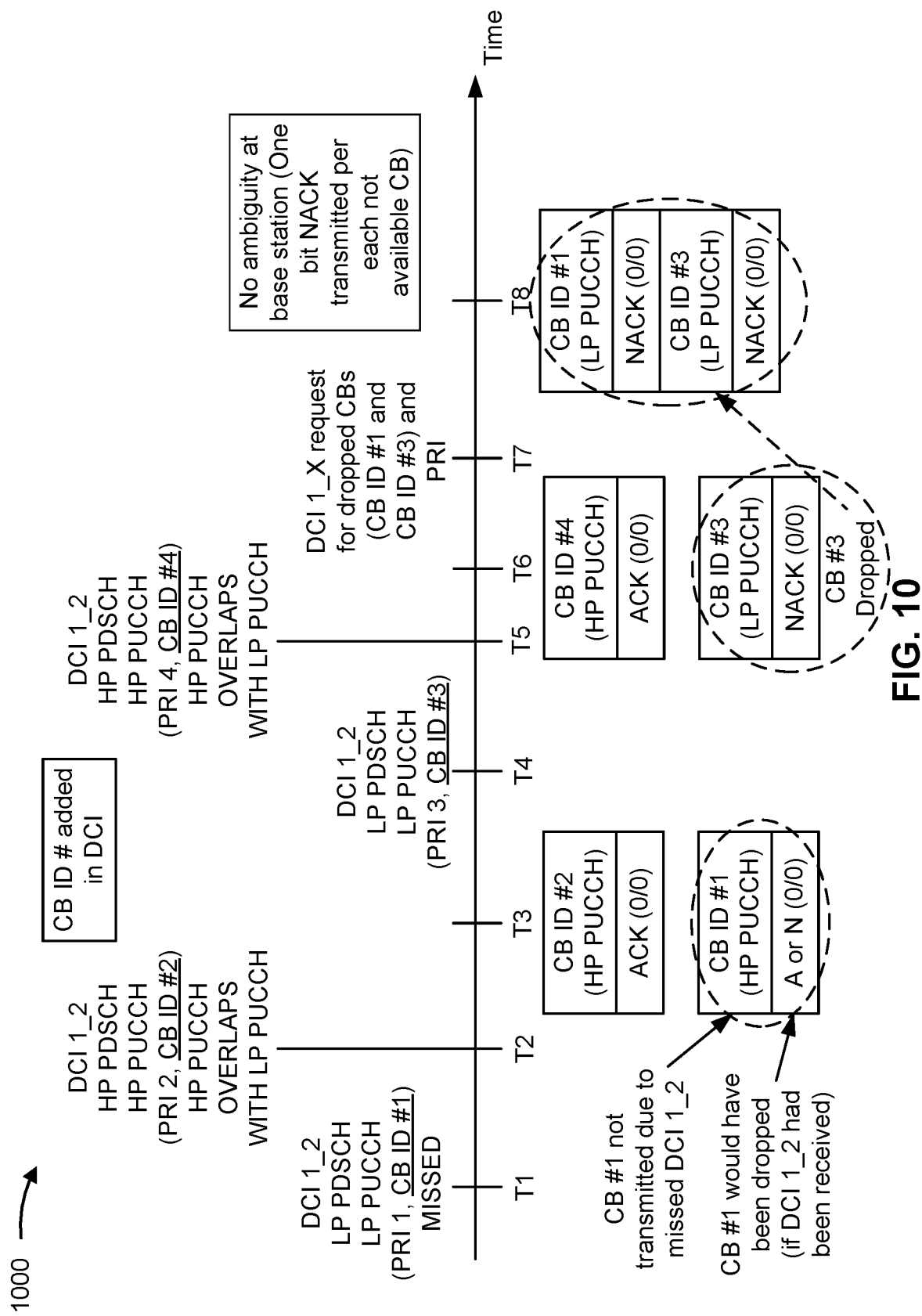

FIG. 10 is a diagram illustrating an example 1000 associated with receiving DCI that indicates codebook IDs, in accordance with the present disclosure.

At a first time point (T1), a UE (e.g., UE 120) may miss a first DCI (e.g., DCI format 1_2) associated with a low priority PDSCH transmission and a low priority PUCCH transmission. In other words, the UE may not receive the first DCI from a network node (e.g., base station 110). The first DCI may be associated with a first PUCCH PRI. The first DCI may indicate a first codebook ID. At a second time point (T2), the UE may receive from the network node a second DCI (e.g., DCI format 1_2) associated with a high priority PDSCH transmission and a high priority PUCCH transmission. The second DCI may be associated with a second PRI. The second DCI may indicate a second codebook ID. The high priority PUCCH transmission may overlap with the low priority PUCCH transmission. At a third time point (T3), the UE may perform a high priority PUCCH transmission, which may be associated with the high priority PDSCH transmission. The high priority PUCCH transmission may be associated with the second codebook, and the high priority PUCCH transmission may indicate the second codebook ID. The UE may not transmit the first codebook associated with the low priority PDSCH transmission due to the first DCI that was missed at the UE. The UE may still would have dropped the first codebook, even if the first DCI was received, since the second codebook is associated with a higher priority as compared to the first codebook.

At a fourth time point (T4), the UE may receive from the network node a third DCI (e.g., DCI format 1_2) associated with a low priority PDSCH transmission and a low priority PUCCH transmission. The third DCI may be associated with a third PRI. The third DCI may indicate a codebook ID. At a fifth time point (T5), the UE may receive from the network node a fourth DCI (e.g., DCI format 1_2) associated with a high priority PDSCH transmission and a high priority PUCCH transmission. The fourth DCI may be associated with a fourth PRI. The fourth DCI may indicate a fourth codebook ID. The high priority PUCCH transmission may overlap with the low priority PUCCH transmission. At a sixth time point (T6), the UE may perform a high priority PUCCH transmission, which may be associated with the high priority PDSCH transmission. The high priority PUCCH transmission may be associated with the fourth codebook, and the high priority PUCCH transmission may indicate the fourth codebook ID. The UE may not transmit the third codebook associated with the low priority PDSCH transmission, since the third codebook is associated with a lower priority as compared to the fourth codebook.

At a seventh time point (T7), the UE may receive from the network node a request in DCI (e.g., DCI format 1_x) for dropped HARQ codebooks. The DCI may indicate the first codebook ID and the third codebook ID as corresponding to the dropped HARQ codebooks. The DCI may indicate a PRI. In an eighth time point (T8), the UE may transmit the first codebook associated with the first DCI and the third codebook associated with the third DCI. The first codebook and the third codebook may both be associated with low priority PUCCH transmissions, which may indicate the first codebook ID and the third codebook ID, respectively. As a result, the network node may be able to determine whether a codebook received from the UE is the first codebook or the third codebook, based at least in part on the first codebook ID and the second codebook ID, respectively. The network node may receive one NACK bit for each codebook that was not available (e.g., the first codebook and the third codebook), and thus the network node may be able to identify the two dropped codebooks that have been transmitted by the UE in response to the request for dropped HARQ codebooks.

As indicated above, FIG. 10 is provided as an example. Other examples may differ from what is described with regard to FIG. 10.

In some aspects, DCI (e.g., DCI format 1_x) may request a transmission (or retransmission) of dropped HARQ codebooks. The DCI may indicate requested codebooks using codebook IDs, where a codebook ID may be a DCI field of three or four bits, such that 8 or 16 codebooks may be requested. The DCI may indicate a PRI for a transmission of the requested codebooks.

For example, a network node may request a transmission of two dropped codebooks. A first dropped codebook may be 8 bits and a second dropped codebook may be 6 bits. A total payload to be transmitted with these two codebooks combined is 14 bits (8 bits plus 6 bits). Since neither a first PRI corresponding to the first codebook nor a second PRI corresponding to the second codebook is able to carry the combined payload of 14 bits, the DCI may indicate the PRI for the transmission of the requested codebooks.

In some aspects, for a missed DCI and a codebook ID indicated by the missed DCI not being available at a UE, only available codebooks may be transmitted by the UE, which may cause blind detection at the network node. The UE may concatenate codebooks reported via UCI in a PUCCH according to an order indicated in DCI requesting the transmission of the dropped HARQ codebooks. For example, a DCI request may be for codebook ID #1 codebook ID #2, and codebook ID #4. When codebook ID #1 is not available, the UE may report UCI that is a concatenation of the codebook ID #3 and the codebook ID #3. The UE may not report any UCI in the case of a single dropped HARQ bit/codebook.

In some aspects, for the missed DCI and the codebook ID indicated by the missed DCI not being available at the UE, the UE may transmit a one-bit NACK for each non-available codebook, which may also cause blind detection at the network node. For example, a first DCI may be missed at the UE, and the first DCI may be associated with codebook ID #1 with four HARQ bits dropped. A second DCI may be correctly decoded at the UE, and the second DCI may be associated with codebook ID #2 with four HARQ bits dropped. In this example, the network node may expect eight HARQ bits in an indicated PRI, but the network node may receive a one-bit NACK and four HARQ bits from the codebook ID #2, so five bits in total. In this example, the network node may not try different combinations during the blind detection, but in other examples, the network node may need to test several combinations (e.g., three codebooks dropped with sizes of six bits, four bits, and two bits, and the network node receives seven bits).

In some aspects, for the missed DCI and the codebook ID indicated by the missed DCI is omitted, the network node may indicate at the DCI requesting the transmission of the dropped HARQ codebooks a quantity of NACK bits to be reported per indicated codebook. For example, the network node may request up to four bits. In this case, the network node may not suffer from ambiguity, since the network node may receive an expected quantity of bits as specified in the DCI requesting the transmission of the HARQ bits. However, one drawback is DCI overhead, as extra bits may be used to indicate a requested codebook length in case of the missed DCI. For example, up to five extra bits may be used to indicate the requested codebook length in case of the missed DCI.

Figure 11:
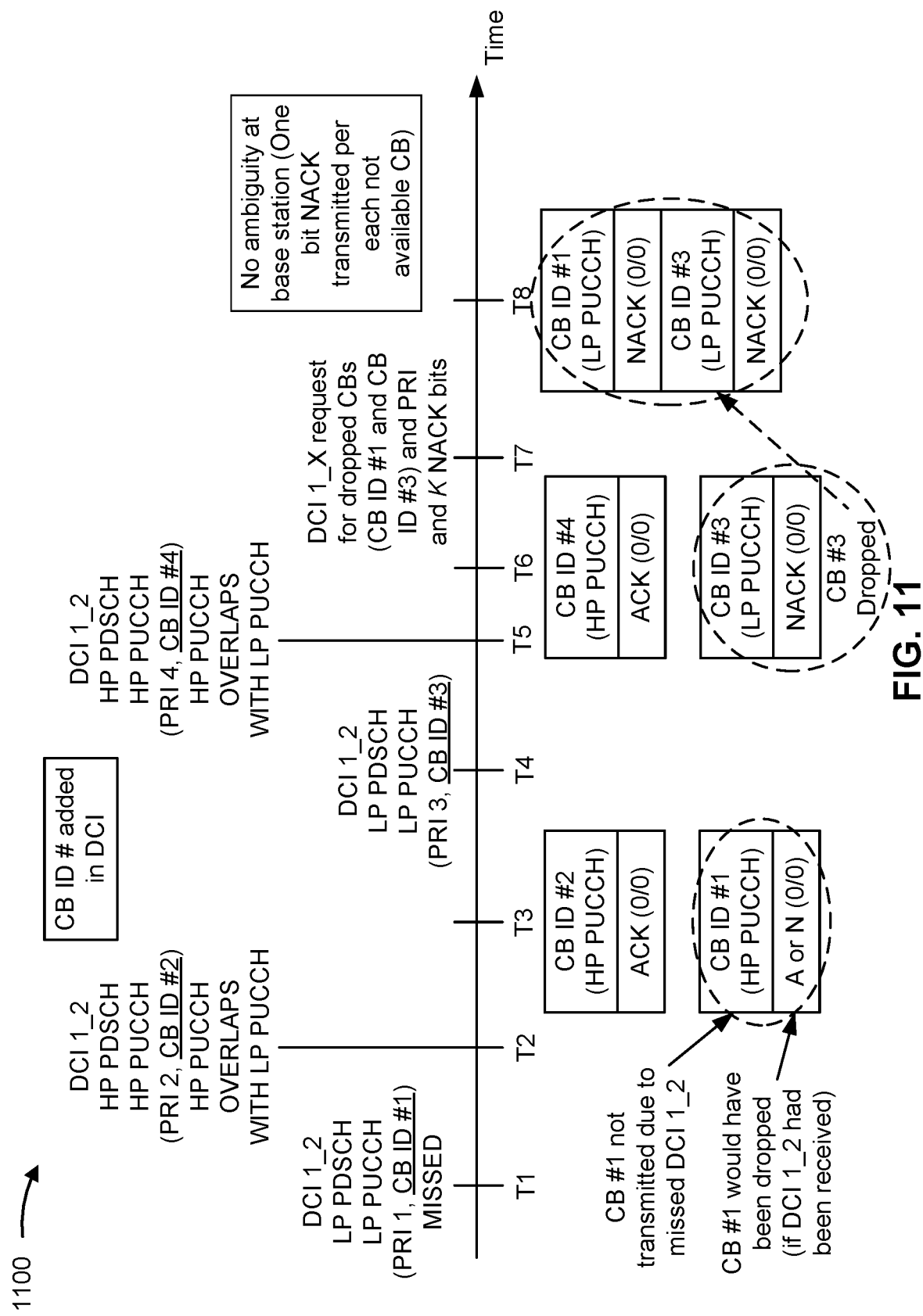

FIG. 11 is a diagram illustrating an example 1100 associated with receiving DCI that indicates codebook IDs, in accordance with the present disclosure.

At a first time point (T1), a UE (e.g., UE 120) may miss a first DCI (e.g., DCI format 1_2) associated with a low priority PDSCH transmission and a low priority PUCCH transmission. In other words, the UE may not receive the first DCI from a network node (e.g., base station 110). The first DCI may be associated with a first PUCCH PRI. The first DCI may indicate a first codebook ID. At a second time point (T2), the UE may receive from the network node a second DCI (e.g., DCI format 1_2) associated with a high priority PDSCH transmission and a high priority PUCCH transmission. The second DCI may be associated with a second PRI. The second DCI may indicate a second codebook ID. The high priority PUCCH transmission may overlap with the low priority PUCCH transmission. At a third time point (T3), the UE may perform a high priority PUCCH transmission, which may be associated with the high priority PDSCH transmission. The high priority PUCCH transmission may be associated with the second codebook, and the high priority PUCCH transmission may indicate the second codebook ID. The UE may not transmit the first codebook associated with the low priority PDSCH transmission due to the first DCI that was missed at the UE.

At a fourth time point (T4), the UE may receive from the network node a third DCI (e.g., DCI format 1_2) associated with a low priority PDSCH transmission and a low priority PUCCH transmission. The third DCI may be associated with a third PRI. The third DCI may indicate a codebook ID. At a fifth time point (T5), the UE may receive from the network node a fourth DCI (e.g., DCI format 1_2) associated with a high priority PDSCH transmission and a high priority PUCCH transmission. The fourth DCI may be associated with a fourth PRI. The fourth DCI may indicate a fourth codebook ID. The high priority PUCCH transmission may overlap with the low priority PUCCH transmission. At a sixth time point (T6), the UE may perform a high priority PUCCH transmission, which may be associated with the high priority PDSCH transmission. The high priority PUCCH transmission may be associated with the fourth codebook, and the high priority PUCCH transmission may indicate the fourth codebook ID. The UE may not transmit the third codebook associated with the low priority PDSCH transmission, since the third codebook is associated with a lower priority as compared to the fourth codebook.

At a seventh time point (T7), the UE may receive from the network node a request in DCI (e.g., DCI format 1_x) for dropped HARQ codebooks. The DCI may indicate the first codebook ID and the third codebook ID as corresponding to the dropped HARQ codebooks. The DCI may indicate a PRI. The DCI may indicate K NACK bits. In other words, the DCI may indicate a quantity of bits to be reported per codebook indicated, which in this case, is the first codebook and the third codebook. The DCI may indicate the K NACK bits due to the missed first DCI and due to a codebook ID being indicated by the missed first DCI being omitted.

In an eighth time point (T8), the UE may transmit the first codebook associated with the first DCI and the third codebook associated with the third DCI. The first codebook and the third codebook may both be associated with low priority PUCCH transmissions, which may indicate the first codebook ID and the third codebook ID, respectively. The UE may transmit the first codebook and the second codebook based at least in part on the request for dropped HARQ codebooks, which indicated the PRI and the K NACK bits. As a result, the network node may receive one NACK bit for each codebook that was not available (e.g., the first codebook and the third codebook), and thus the network node may be able to identify the two dropped codebooks that have been transmitted by the UE in response to the request for dropped HARQ codebooks.

As indicated above, FIG. 11 is provided as an example. Other examples may differ from what is described with regard to FIG. 11.

In some aspects, for the missed DCI and the codebook ID indicated by the missed DCI not being available at the UE, a network node may indicate a requested codebook size in DCI, or alternatively, the network node may perform blind decoding over different UCI sizes (e.g., 1 bit or N bits). In order to avoid this additional overhead in DCI or the network node performing the blind decoding, after the network node transmits the request for dropped HARQ codebooks, the UE may report a single bit per dropped HARQ codebook. The single bit may be based at least in part on a logical AND operation of all HARQ bits in the dropped HARQ codebook. The UE may report the single bit per dropped HARQ codebook for a Type 2 HARQ. Further, the UE may report the single bit per dropped HARQ codebook for Type 1 HARQ when applied only to received bits in the dropped HARQ codebook, and when the dropped HARQ codebook is equal to a size of one bit.

In some aspects, when an SPS PUCCH HARQ is not multiplexed with HARQ feedback corresponding to a downlink grant PDSCH, a PUCCH numbering may be applied. DCI that requests dropped HARQ codebooks colliding with downlink SPS PUCCH HARQ bits may indicate a PUCCH number (or PUCCH ID) to be transmitted. The DCI requesting the dropped HARQ codebooks to be retransmitted may indicate a new PRI.

In some aspects, for simultaneous multiple CCs, a unique SPS PUCCH numbering may be applied (e.g., PUCCH ID #0 for CC 0, PUCCH ID #1 for CC 1, and so on). A DCI 1_x initiating an SPS may initiate the SPS PUCCH numbering. The SPS PUCCH numbering may be associated with four bits, such that an SPS PUCCH counter may be associated with a value ranging from 0 to 15. The SPS PUCCH numbering may be valid when an SPS PUCCH HARQ is multiplexed with UCI corresponding to a downlink grant PDSCH. The SPS PUCCH numbering may be robust since the SPS PUCCH numbering may be initiated with DCI initiating an SPS configuration. The PUCCH numbering may apply for an SPS PUCCH containing only channel state information (CSI) reports. Further, for joint HARQ and CSI transmission (e.g., the UE is provided with a simultaneous HARQ-ACK-CSI (simultaneousHARQ-ACK-CSI) parameter), these SPS PUCCH occasions may be counted as well.

Figure 12:
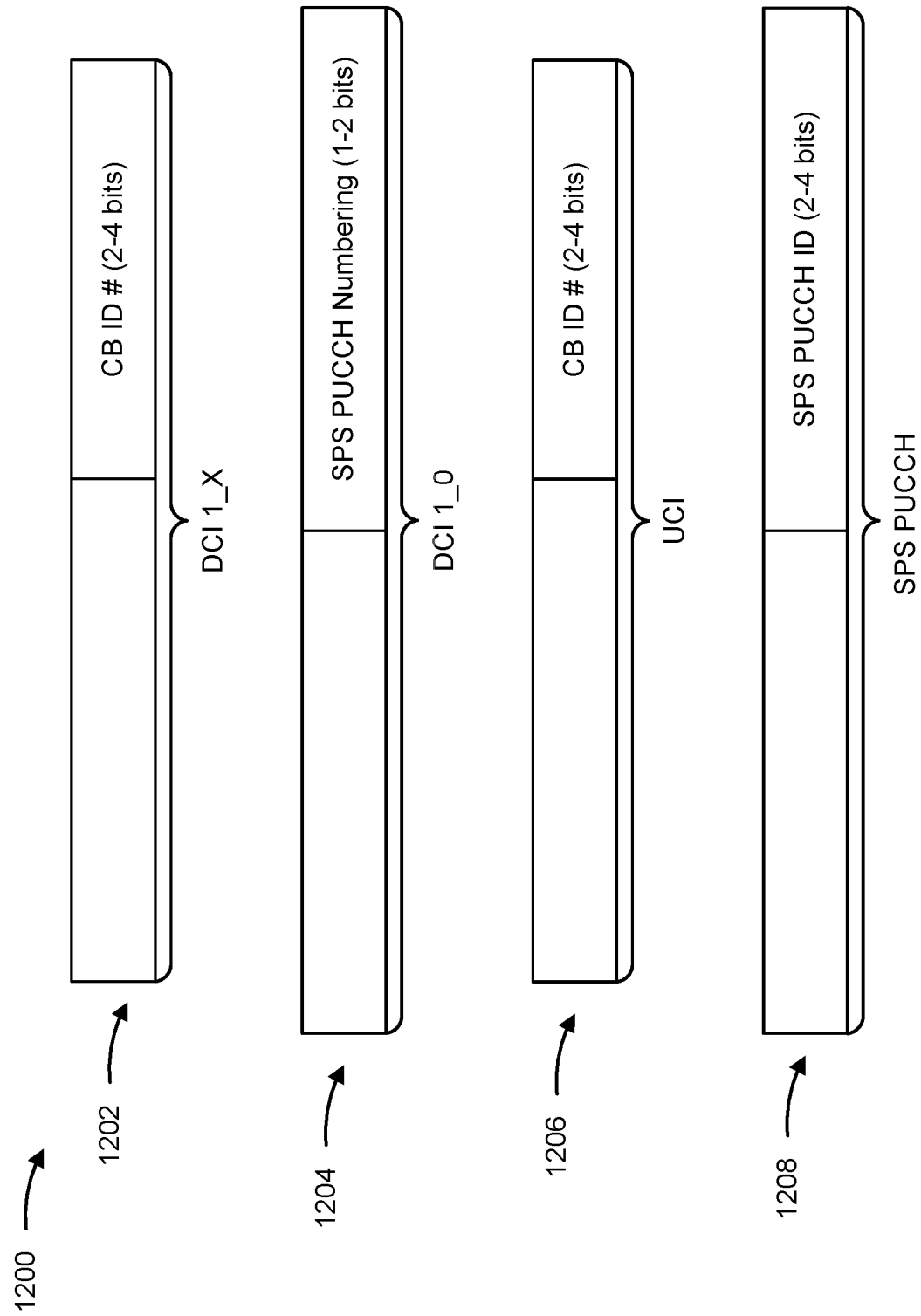

FIG. 12 is a diagram illustrating an example 1200 associated with receiving DCI that indicates codebook IDs, in accordance with the present disclosure.

As shown by reference number 1202, a DCI format 1_x transmission may be associated with a downlink grant PDSCH. The DCI format 1_x transmission may indicate a codebook ID, which may be a variable size ranging from two bits to four bits. The variable size may be based at least in part on an RRC configuration.

As shown by reference number 1204, a DCI format 1_0 transmission may initiate an SPS configuration, and may indicate an SPS PUCCH numbering field size. The DCI format 1_0 transmission initiating the SPS configuration may indicate a size of an SPS PUCCH counter, which may be one bit or two bits. For example, an SPS PUCCH counter maximum value of three (which may be coded in two bits) may indicate that a maximum SPS PUCCH number is 15.

As shown by reference number 1206, a UCI transmission in a PUCCH or a PUSCH may indicate a codebook ID, which may range from two bits to four bits. The 2-4 bits may be appended each time the UCI is transmitted.

As shown by reference number 1208, an SPS PUCCH transmission may indicate an SPS PUCCH ID, which may range from two bits to four bits. The SPS PUCCH ID may be optionally appended to the SPS PUCCH transmission.

As indicated above, FIG. 12 is provided as an example. Other examples may differ from what is described with regard to FIG. 12.

In some aspects, a DCI format 1_x transmission may request a transmission (or retransmission) of dropped HARQ codebooks. The DCI format 1_x transmission may indicate a codebook number per codebook requested and/or a codebook ID. The DCI format 1_x transmission may indicate up to 4 codebooks, 8 codebooks, or 16 codebooks. The DCI format 1_x transmission may indicate a codebook range per CC (e.g., CB #1 to CB #3). The DCI format 1_x transmission may indicate a codebook range common to a plurality of CCs. In some cases, a codebook ID may be replaced by a PUCCH occasion ID. In some aspects, the DCI format 1_x transmission may indicate an amount of NACK bits per missing codebook, when not configured via RRC signaling.

Figure 13:
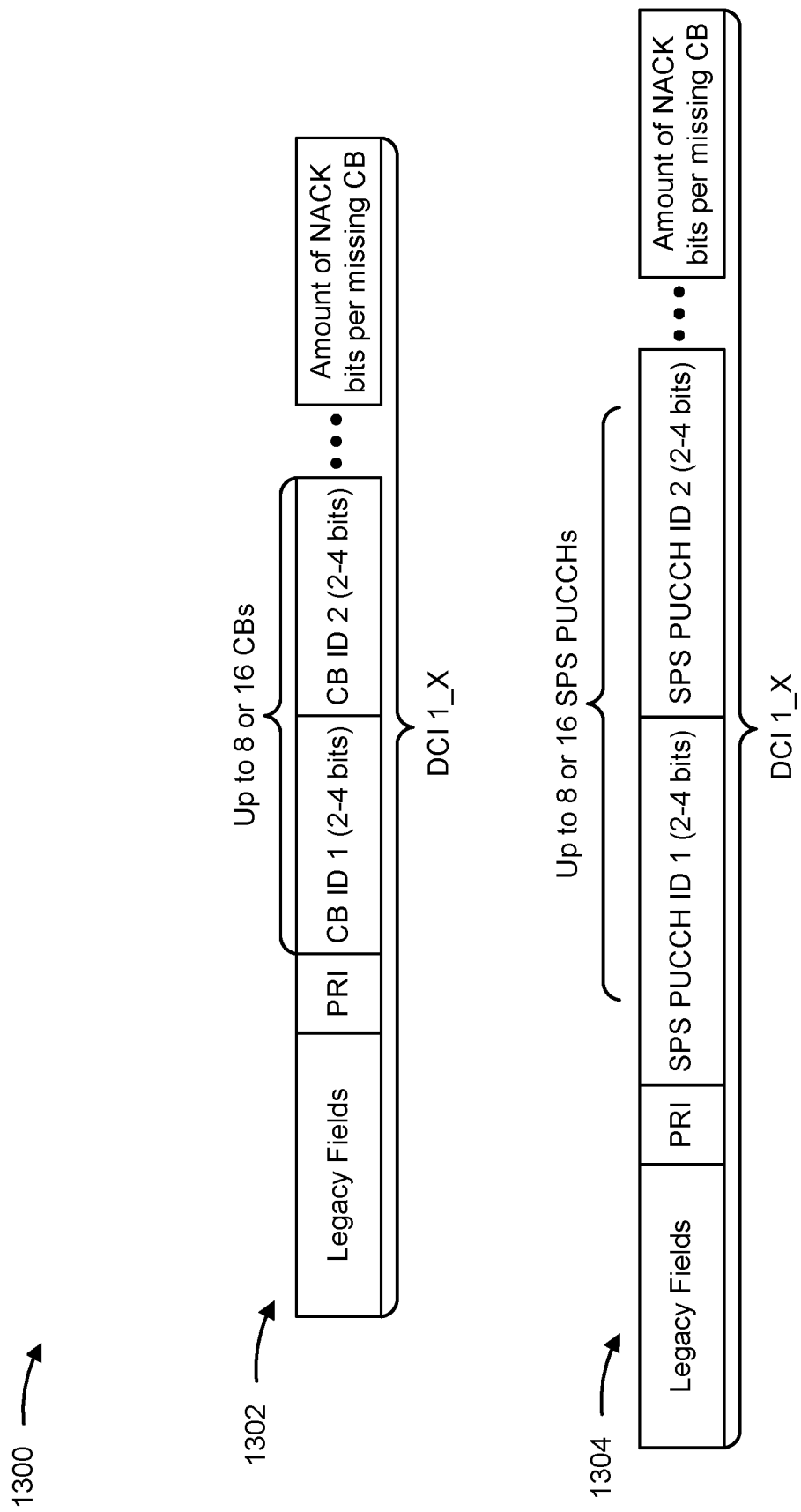

FIG. 13 is a diagram illustrating an example 1300 associated with receiving DCI that indicates codebook IDs, in accordance with the present disclosure.

As shown by reference number 1302, a DCI format 1_x transmission may be associated with HARQ codebooks for a downlink grant PDSCH. The DCI format 1_x transmission may indicate legacy fields. The DCI format 1_x transmission may indicate a PRI. The DCI format 1_x transmission may indicate one or more codebook (CB) IDs, such as a codebook ID 1 and a codebook ID 2, which may each be 2-4 bits in size. The DCI format 1_x transmission may indicate codebook IDs for up to 8 codebooks or 16 codebooks. Further, the DCI format 1_x transmission may indicate a quantity of NACK bits per missing codebook.

As shown by reference number 1304, a DCI format 1_x transmission may be associated with HARQ codebooks for an SPS PDSCH. The DCI format 1_x transmission may indicate legacy fields. The DCI format 1_x transmission may indicate a PRI. The DCI format 1_x transmission may indicate one or more SPS PUCCH IDS, such as an SPS PUCCH ID 1 and an SPS PUCCH ID 2, which may each be 2-4 bits in size. The DCI format 1_x transmission may indicate SPS PUCCH IDs for up to 8 SPS PUCCHs or 16 SPS PUCCHs. Further, the DCI format 1_x transmission may indicate a quantity of NACK bits per missing codebook.

As indicated above, FIG. 13 is provided as an example. Other examples may differ from what is described with regard to FIG. 13.

In some aspects, a DCI format 0_x transmission may request a transmission (or retransmission) of dropped HARQ codebooks. The DCI format 0_x transmission may include one bit that indicates that the DCI format 0_x transmission is not for scheduling a PUSCH but for requesting a transmission (or retransmission) of dropped HARQ codebooks. In some cases, the one bit may indicate that the DCI format 0_x transmission is not only for scheduling the PUSCH, but also for requesting the transmission (or retransmission) of the dropped HARQ codebooks. The DCI format 0_x transmission may indicate a PRI for a PUCCH, when the transmission (or retransmission) is not via the PUSCH. The DCI format 0_x transmission may indicate a codebook number per codebook requested. The DCI format 0_x transmission may indicate up to 4 codebooks, 8 codebooks, or 16 codebooks. The DCI format 1_x transmission may indicate an amount of NACK bits per missing codebook, when not configured via RRC signaling.

Figure 14:
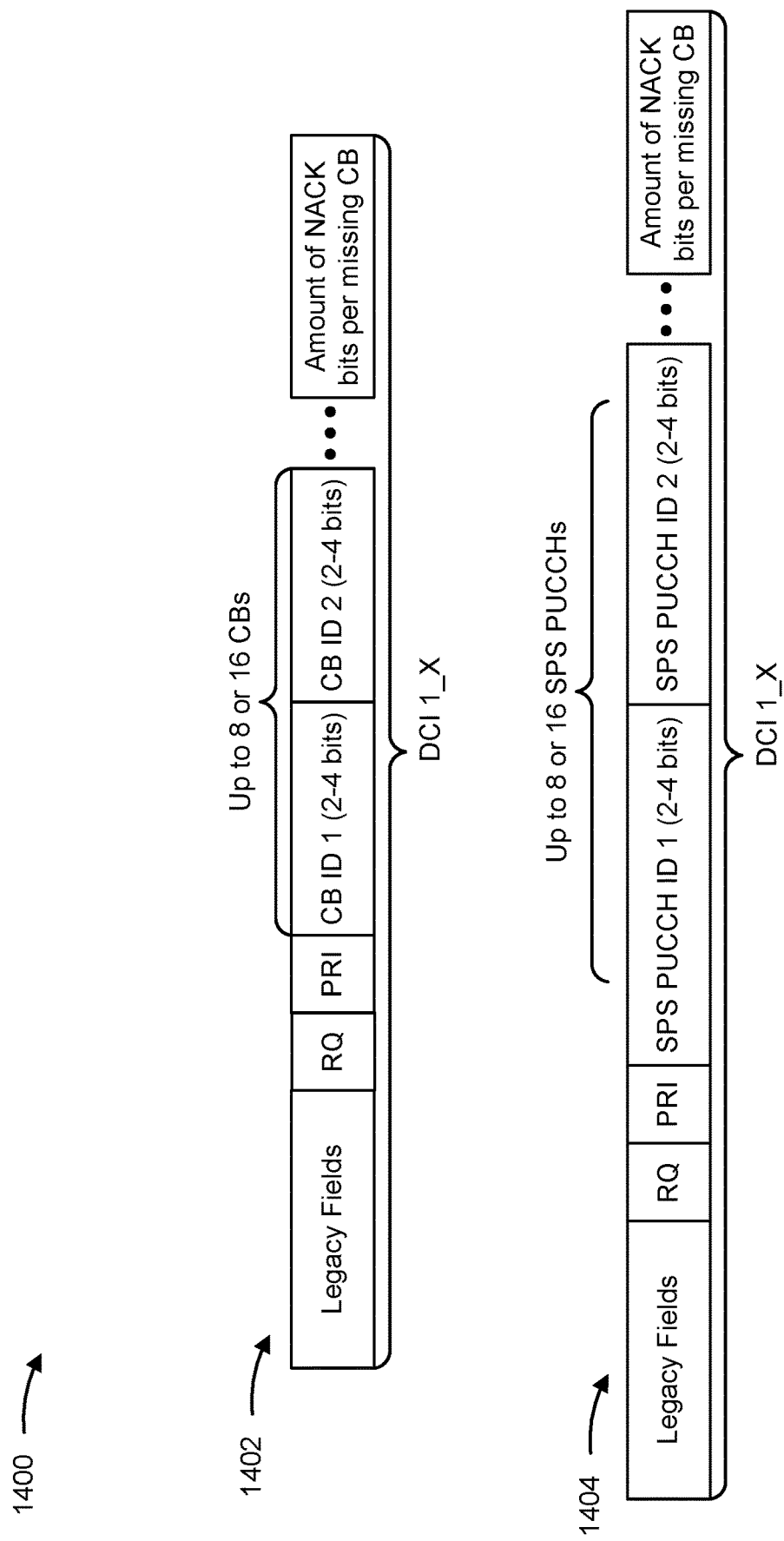

FIG. 14 is a diagram illustrating an example 1400 of receiving DCI that indicates codebook IDs, in accordance with the present disclosure.

As shown by reference number 1402, a DCI format 0_x transmission may be associated with HARQ codebooks for a downlink grant PDSCH. The DCI format 0_x transmission may indicate legacy fields. The DCI format 0_x transmission may indicate a request (RQ) for missing codebooks. The DCI format 0_x transmission may indicate a PRI. The DCI format 0_x transmission may indicate one or more codebook IDs, such as a codebook ID 1 and a codebook ID 2, which may each be 2-4 bits in size. The DCI format 0_x transmission may indicate codebook IDs for up to 8 codebooks or 16 codebooks. Further, the DCI format 0_x transmission may indicate a quantity of NACK bits per missing codebook.

As shown by reference number 1404, a DCI format 0_x transmission may be associated with HARQ codebooks for an SPS PDSCH. The DCI format 0_x transmission may indicate legacy fields. The DCI format 0_x transmission may indicate a request (RQ) for missing codebooks. The DCI format 0_x transmission may indicate a PRI. The DCI format 0_x transmission may indicate one or more SPS PUCCH IDS, such as an SPS PUCCH ID 1 and an SPS PUCCH ID 2, which may each be 2-4 bits in size. The DCI format 0_x transmission may indicate SPS PUCCH IDs for up to 8 SPS PUCCHs or 16 SPS PUCCHs. Further, the DCI format 0_x transmission may indicate a quantity of NACK bits per missing codebook.

As indicated above, FIG. 14 is provided as an example. Other examples may differ from what is described with regard to FIG. 14.

In some aspects, in a current approach as described herein, a network node may request a transmission (or retransmission) of dropped HARQ codebooks (or canceled HARQ codebooks). The current approach may be applied to Type 1 HARQ, unlike an Enhanced Type 2 HARQ. The current approach does not rely on a new field indicator (NFI), thereby being a simplified version of the Enhanced Type 2 HARQ. The current approach provides a more flexible solution than the Enhanced Type 2 HARQ, since a scheduler does not need to set a given PDSCH in a group upon a DCI 1_x transmission. In the current approach, a codebook ID may be transmitted only upon the DCI 1_x transmission requesting HARQ feedback corresponding to a last bit in a HARQ codebook. The current approach enables a concatenation of new and previous HARQ codebooks by concatenating codebooks. The current approach may enable a transmission of a single bit for each dropped HARQ codebook by using a logical AND operation for a plurality of bits, which is not provided in the Enhanced Type 2 HARQ. Further, in the current approach, more than two dropped HARQ bits may be transmitted, which is not provided in the Enhanced Type 2 HARQ.

Figure 15:
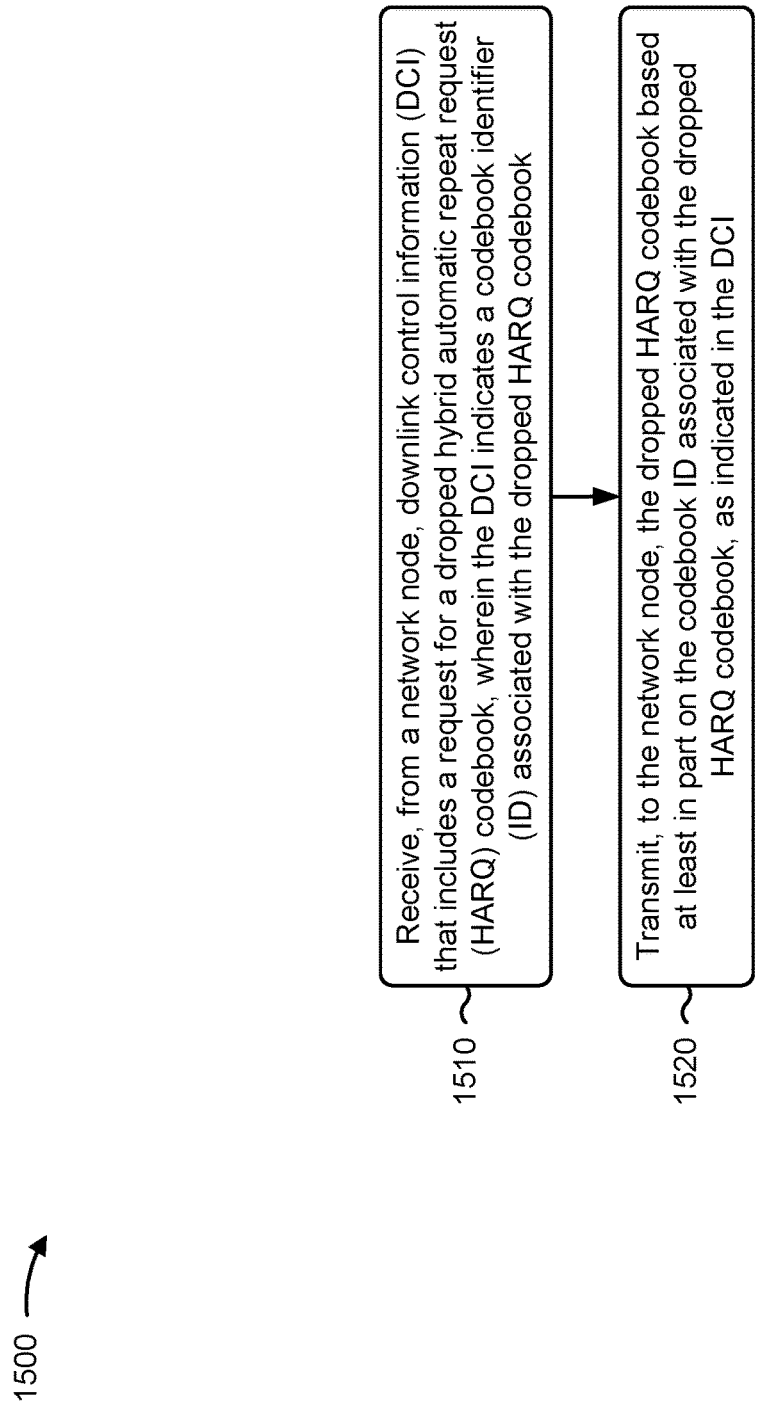
FIGS. 15-16 are diagrams illustrating example processes associated with receiving DCI that indicates codebook IDs, in accordance with the present disclosure.

FIG. 15 is a diagram illustrating an example process 1500 performed, for example, by a UE, in accordance with the present disclosure. Example process 1500 is an example where the UE (e.g., UE 120) performs operations associated with receiving DCI that indicates codebook IDs.

As shown in FIG. 15, in some aspects, process 1500 may include receiving, from a network node, DCI that includes a request for a dropped HARQ codebook, wherein the DCI indicates a codebook ID associated with the dropped HARQ codebook (block 1510). For example, the UE (e.g., using reception component 1702, depicted in FIG. 17) may receive, from a network node, DCI that includes a request for a dropped HARQ codebook, wherein the DCI indicates a codebook ID associated with the dropped HARQ codebook, as described above.

As further shown in FIG. 15, in some aspects, process 1500 may include transmitting, to the network node, the dropped HARQ codebook based at least in part on the codebook ID associated with the dropped HARQ codebook, as indicated in the DCI (block 1520). For example, the UE (e.g., using transmission component 1704, depicted in FIG. 17) may transmit, to the network node, the dropped HARQ codebook based at least in part on the codebook ID associated with the dropped HARQ codebook, as indicated in the DCI, as described above.

Process 1500 may include additional aspects, such as any single aspect or any combination of aspects described below and/or in connection with one or more other processes described elsewhere herein.

In a first aspect, the DCI indicates one or more of a codebook number associated with the dropped HARQ codebook, a codebook range per CC, or a codebook range common to a plurality of CCs, and the codebook number is associated with an implicit codebook concatenation order or an explicit codebook concatenation order based at least in part on the request included in the DCI.

In a second aspect, alone or in combination with the first aspect, the codebook ID is a DCI field that supports a request of up to 16 dropped HARQ codebooks.

In a third aspect, alone or in combination with one or more of the first and second aspects, the dropped HARQ codebook is associated with a missed DCI and the missed DCI indicates the codebook ID; or the dropped HARQ codebook is associated with a low priority PUCCH transmission that conflicts with a high priority PUCCH transmission, and the low priority PUCCH transmission is associated with a low priority physical downlink shared channel transmission that indicates the codebook ID.

In a fourth aspect, alone or in combination with one or more of the first through third aspects, the dropped HARQ codebook is associated with a missed DCI and a codebook ID indicated by the missed DCI is not available at the UE, and process 1500 further includes transmitting, to the network node, available HARQ codebooks associated with codebook IDs available at the UE, wherein the available HARQ codebooks are concatenated in a PUCCH based at least in part on an order indicated in the DCI, and the UE is configured to perform no HARQ codebook transmission for a single dropped HARQ codebook.

In a fifth aspect, alone or in combination with one or more of the first through fourth aspects, the dropped HARQ codebook is associated with a missed DCI and a codebook ID indicated by the missed DCI is not available at the UE, and process 1500 further includes transmitting, to the network node, a NACK for each non-available HARQ codebook.

In a sixth aspect, alone or in combination with one or more of the first through fifth aspects, the dropped HARQ codebook is associated with a missed DCI and a codebook ID indicated by the missed DCI is not available at the UE, wherein the DCI indicates a quantity of NACK bits associated with the dropped HARQ codebook, and the quantity of NACK bits indicate a requested codebook length due to the missed DCI.

In a seventh aspect, alone or in combination with one or more of the first through sixth aspects, process 1500 includes transmitting one bit for the dropped HARQ codebook, wherein the one bit corresponds to a logical AND operation of a plurality of HARQ bits associated with the dropped HARQ codebook.

In an eighth aspect, alone or in combination with one or more of the first through seventh aspects, the DCI indicates an SPS PUCCH ID associated with the dropped HARQ codebook, and the DCI indicating the SPS PUCCH ID indicates a PRI associated with transmitting the dropped HARQ codebook.

In a ninth aspect, alone or in combination with one or more of the first through eighth aspects, an SPS PUCCH numbering is applicable based at least in part on an SPS PUCCH HARQ not multiplexed with HARQ feedback corresponding to a downlink grant PDSCH, or the SPS PUCCH numbering is applicable based at least in part on the SPS PUCCH HARQ being multiplexed with UCI corresponding to the downlink grant PDSCH.

In a tenth aspect, alone or in combination with one or more of the first through ninth aspects, the SPS PUCCH numbering is a unique SPS PUCCH numbering based at least in part on a plurality of CCs.

In an eleventh aspect, alone or in combination with one or more of the first through tenth aspects, the DCI indicates the codebook ID or the SPS PUCCH numbering, the UCI indicates the codebook ID, or an SPS PUCCH indicates the SPS PUCCH ID.

In a twelfth aspect, alone or in combination with one or more of the first through eleventh aspects, the DCI indicates one or more of a request for the dropped HARQ codebook, a PRI or a PUSCH associated with a transmission of the dropped HARQ codebook, or a quantity of NACK bits per dropped HARQ codebook, and the request for the dropped HARQ codebook indicates that the DCI is not for scheduling a PUSCH and is for requesting the dropped HARQ codebook.

In a thirteenth aspect, alone or in combination with one or more of the first through twelfth aspects, the DCI is associated with HARQ codebooks for a downlink grant PDSCH transmission, or wherein the DCI is associated with HARQ codebooks for an SPS PDSCH transmission.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
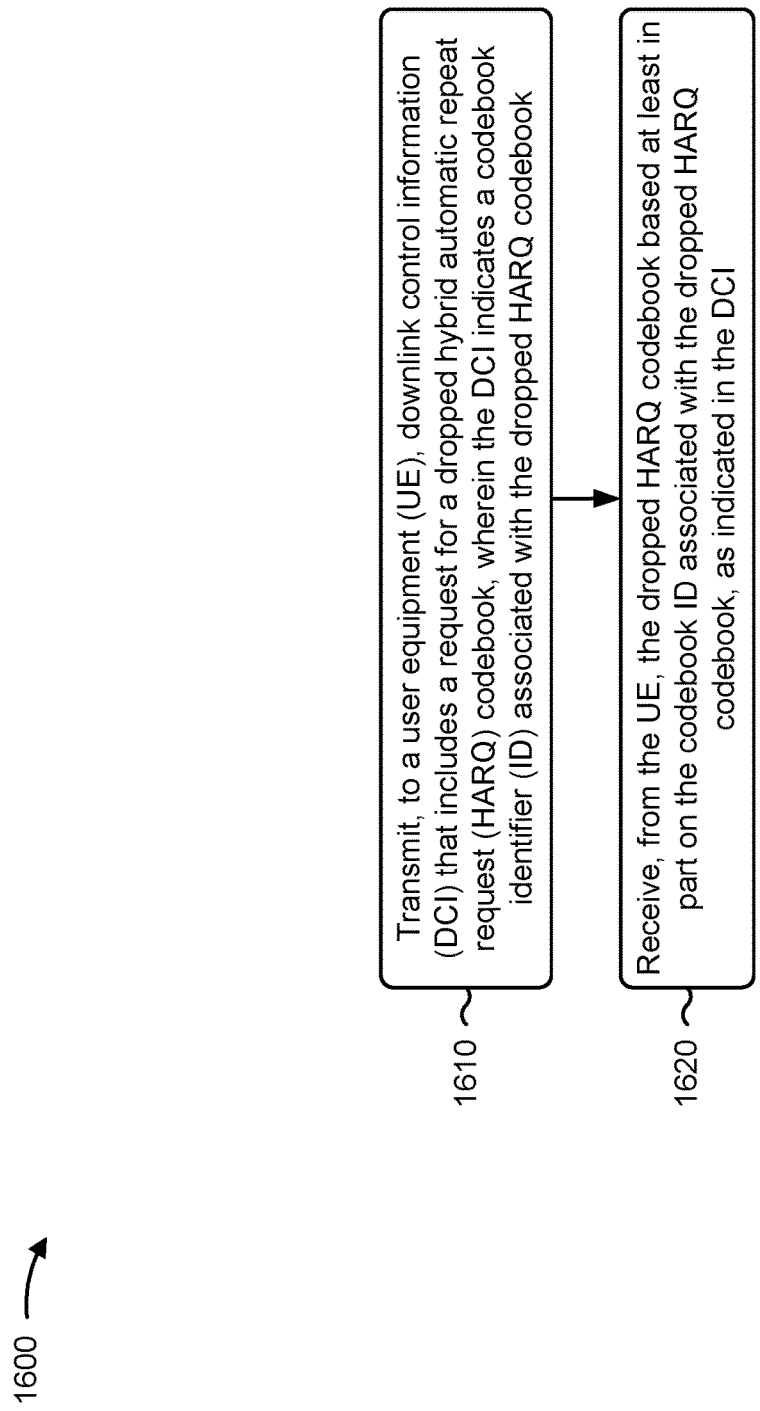

FIG. 16 is a diagram illustrating an example process 1600 performed, for example, by a network node, in accordance with the present disclosure. Example process 1600 is an example where the network node (e.g., base station 110) performs operations associated with receiving DCI that indicates codebook IDs.

As shown in FIG. 16, in some aspects, process 1600 may include transmitting, to a UE, DCI that includes a request for a dropped HARQ codebook, wherein the DCI indicates a codebook ID associated with the dropped HARQ codebook (block 1610). For example, the network node (e.g., using transmission component 1804, depicted in FIG. 18) may transmit, to a UE, DCI that includes a request for a dropped HARQ codebook, wherein the DCI indicates a codebook ID associated with the dropped HARQ codebook, as described above.

As further shown in FIG. 16, in some aspects, process 1600 may include receiving, from the UE, the dropped HARQ codebook based at least in part on the codebook ID associated with the dropped HARQ codebook, as indicated in the DCI (block 1620). For example, the network node (e.g., using reception component 1702, depicted in FIG. 17) may receive, from the UE, the dropped HARQ codebook based at least in part on the codebook ID associated with the dropped HARQ codebook, as indicated in the DCI, as described above.

Process 1600 may include additional aspects, such as any single aspect or any combination of aspects described below and/or in connection with one or more other processes described elsewhere herein.

In a first aspect, the DCI indicates one or more of a codebook number associated with the dropped HARQ codebook, a codebook range per CC, or a codebook range common to a plurality of CCs, and the codebook number is associated with an implicit codebook concatenation order or an explicit codebook concatenation order based at least in part on the request included in the DCI.

In a second aspect, alone or in combination with the first aspect, the codebook ID is a DCI field that supports a request of up to 16 dropped HARQ codebooks.

In a third aspect, alone or in combination with one or more of the first and second aspects, the dropped HARQ codebook is associated with a missed DCI and the missed DCI indicates the codebook ID; or the dropped HARQ codebook is associated with a low priority PUCCH transmission that conflicts with a high priority PUCCH transmission, and the low priority PUCCH transmission is associated with a low priority PDSCH transmission that indicates the codebook ID.

In a fourth aspect, alone or in combination with one or more of the first through third aspects, the dropped HARQ codebook is associated with a missed DCI and a codebook ID indicated by the missed DCI is not available at the UE, and process 1600 further includes receiving, from the UE, available HARQ codebooks associated with codebook IDs available at the UE, wherein the available HARQ codebooks are concatenated in a PUCCH based at least in part on an order indicated in the DCI, and the UE is configured to perform no HARQ codebook transmission for a single dropped HARQ codebook.

In a fifth aspect, alone or in combination with one or more of the first through fourth aspects, the dropped HARQ codebook is associated with a missed DCI and a codebook ID indicated by the missed DCI is not available at the UE, and process 1600 further includes receiving, from the UE, a NACK for each non-available HARQ codebook.

In a sixth aspect, alone or in combination with one or more of the first through fifth aspects, the dropped HARQ codebook is associated with a missed DCI and a codebook ID indicated by the missed DCI is not available at the UE, wherein the DCI indicates a quantity of NACK bits associated with the dropped HARQ codebook, and the quantity of NACK bits indicate a requested codebook length due to the missed DCI.

In a seventh aspect, alone or in combination with one or more of the first through sixth aspects, process 1600 includes receiving one bit for the dropped HARQ codebook, wherein the one bit corresponds to a logical AND operation of a plurality of HARQ bits associated with the dropped HARQ codebook.

In an eighth aspect, alone or in combination with one or more of the first through seventh aspects, the DCI indicates an SPS PUCCH ID associated with the dropped HARQ codebook, and the DCI indicating the SPS PUCCH ID indicates a PRI associated with transmitting the dropped HARQ codebook.

In a ninth aspect, alone or in combination with one or more of the first through eighth aspects, an SPS PUCCH numbering is applicable based at least in part on an SPS PUCCH HARQ not multiplexed with HARQ feedback corresponding to a downlink grant PDSCH, or the SPS PUCCH numbering is applicable based at least in part on the SPS PUCCH HARQ being multiplexed with UCI corresponding to the downlink grant PDSCH.

In a tenth aspect, alone or in combination with one or more of the first through ninth aspects, the SPS PUCCH numbering is a unique SPS PUCCH numbering based at least in part on a plurality of CCs.

In an eleventh aspect, alone or in combination with one or more of the first through tenth aspects, the DCI indicates the codebook ID or the SPS PUCCH numbering, the UCI indicates the codebook ID, or an SPS PUCCH indicates the SPS PUCCH ID.

In a twelfth aspect, alone or in combination with one or more of the first through eleventh aspects, the DCI indicates one or more of a request for the dropped HARQ codebook, a PRI or a PUSCH associated with a transmission of the dropped HARQ codebook, or a quantity of NACK bits per dropped HARQ codebook, and the request for the dropped HARQ codebook indicates that the DCI is not for scheduling a PUSCH and is for requesting the dropped HARQ codebook.

In a thirteenth aspect, alone or in combination with one or more of the first through twelfth aspects, the DCI is associated with HARQ codebooks for a downlink grant PDSCH transmission, or the DCI is associated with HARQ codebooks for an SPS PDSCH transmission.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
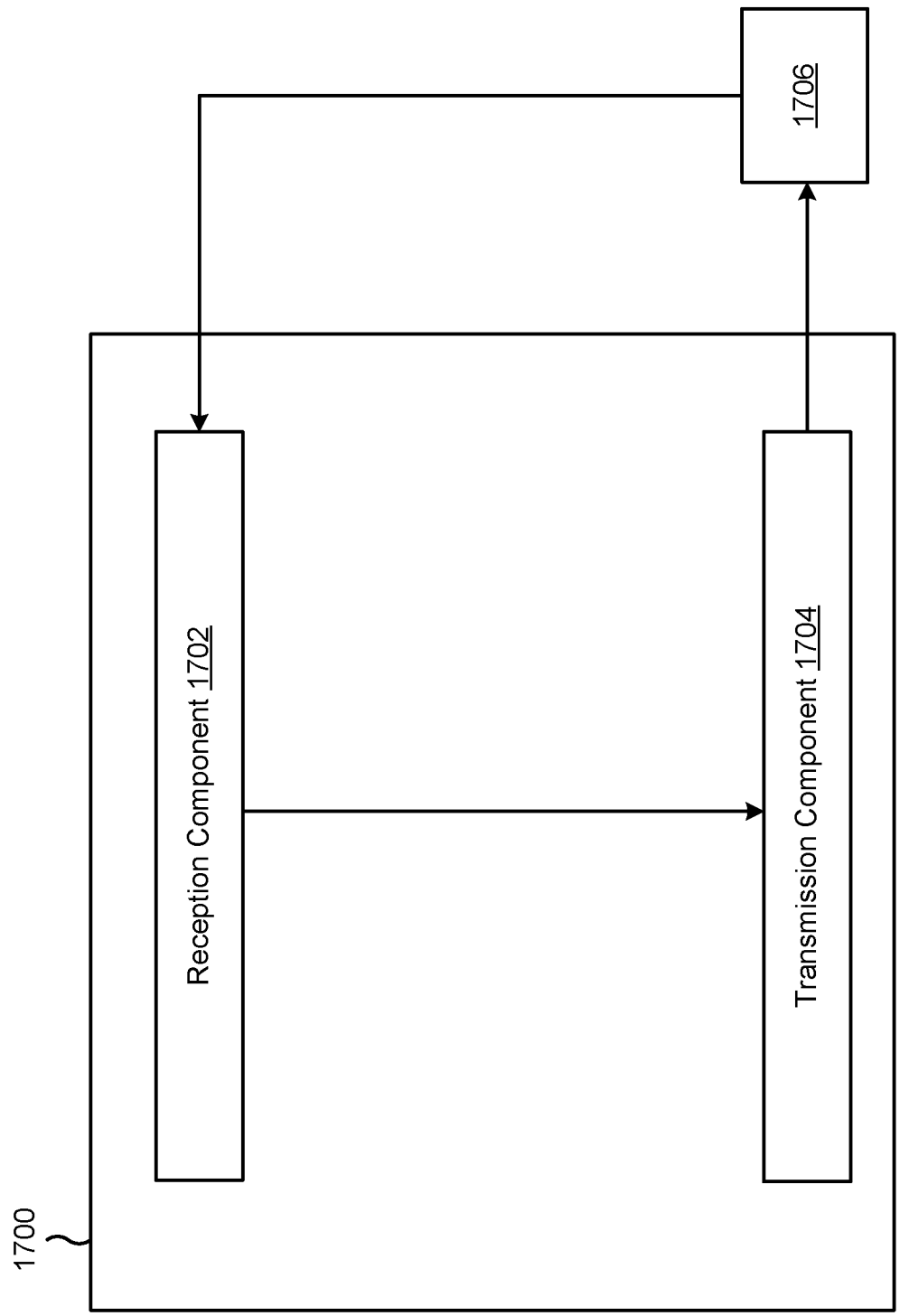
FIGS. 17-18 are diagrams of example apparatuses for wireless communication, in accordance with the present disclosure.

FIG. 17 is a diagram of an example apparatus 1700 for wireless communication. The apparatus 1700 may be a UE, or a UE may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a network node, a base station, or another wireless communication device) using the reception component 1702 and the transmission component 1704.

In some aspects, the apparatus 1700 may be configured to perform one or more operations described herein in connection with FIGS. 9-14. Additionally, or alternatively, the apparatus 1700 may be configured to perform one or more processes described herein, such as process 1500 of FIG. 15. In some aspects, the apparatus 1700 and/or one or more components shown in FIG. 17 may include one or more components of the UE described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the UE described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the UE described in connection with FIG. 2. In some aspects, the transmission component 1704 may be co-located with the reception component 1702 in a transceiver.

The reception component 1702 may receive, from a network node, DCI that includes a request for a dropped HARQ codebook, wherein the DCI indicates a codebook ID associated with the dropped HARQ codebook. The transmission component 1704 may transmit, to the network node, the dropped HARQ codebook based at least in part on the codebook ID associated with the dropped HARQ codebook, as indicated in the DCI.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
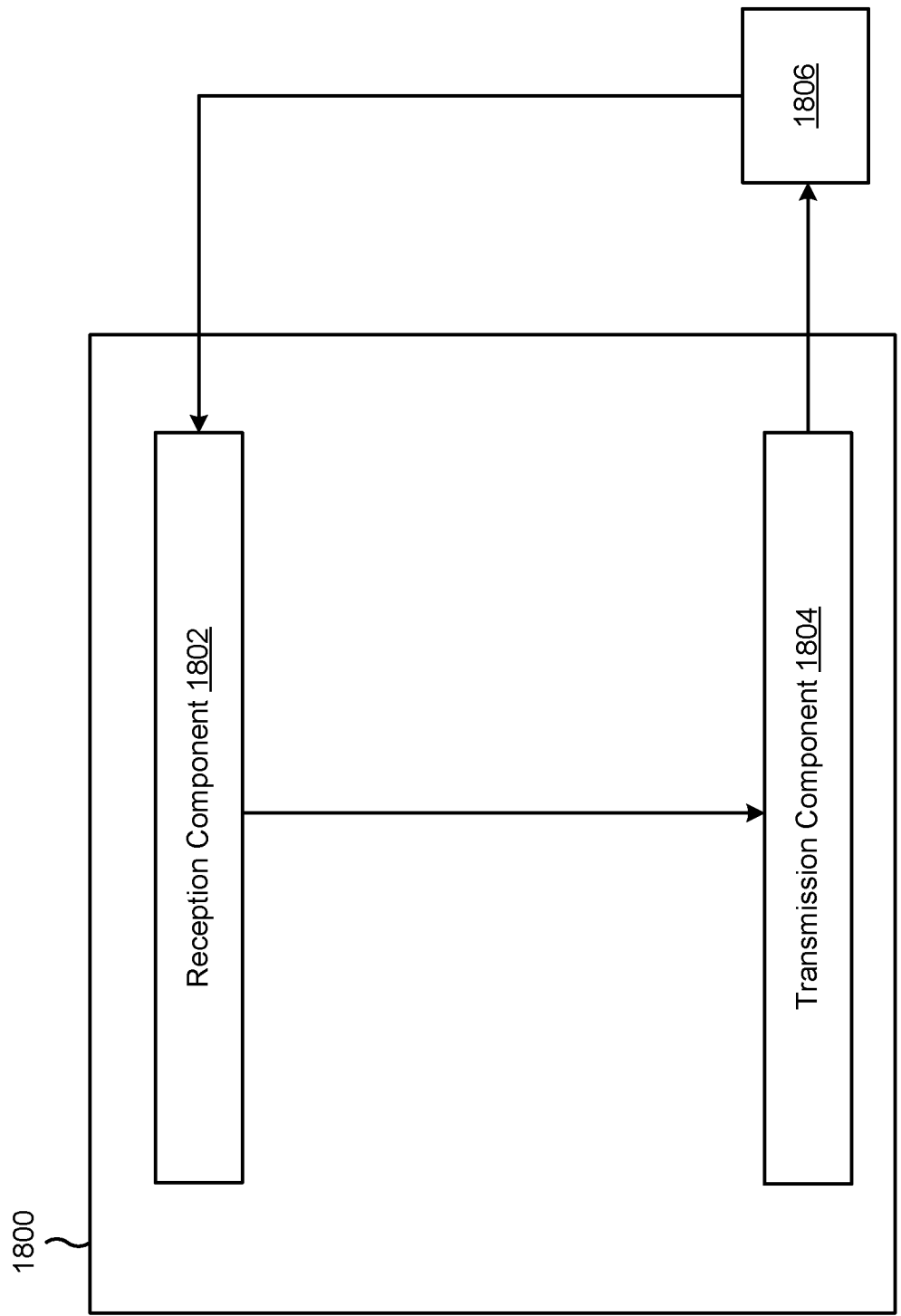

FIG. 18 is a diagram of an example apparatus 1800 for wireless communication. The apparatus 1800 may be a network node, or a network node may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a network node, a base station, or another wireless communication device) using the reception component 1802 and the transmission component 1804.

In some aspects, the apparatus 1800 may be configured to perform one or more operations described herein in connection with FIGS. 9-14. Additionally, or alternatively, the apparatus 1800 may be configured to perform one or more processes described herein, such as process 1600 of FIG. 16. In some aspects, the apparatus 1800 and/or one or more components shown in FIG. 18 may include one or more components of the base station described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a modem, a demodulator, a MIMO detector, a receive processor, a controller/processor, a memory, or a combination thereof, of the base station described in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modem, a modulator, a transmit MIMO processor, a transmit processor, a controller/processor, a memory, or a combination thereof, of the base station described in connection with FIG. 2. In some aspects, the transmission component 1804 may be co-located with the reception component 1802 in a transceiver.

The transmission component 1804 may transmit, to a UE, DCI that includes a request for a dropped HARQ codebook, wherein the DCI indicates a codebook ID associated with the dropped HARQ codebook. The reception component 1802 may receive, from the UE, the dropped HARQ codebook based at least in part on the codebook ID associated with the dropped HARQ codebook, as indicated in the DCI.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

Figure 19:
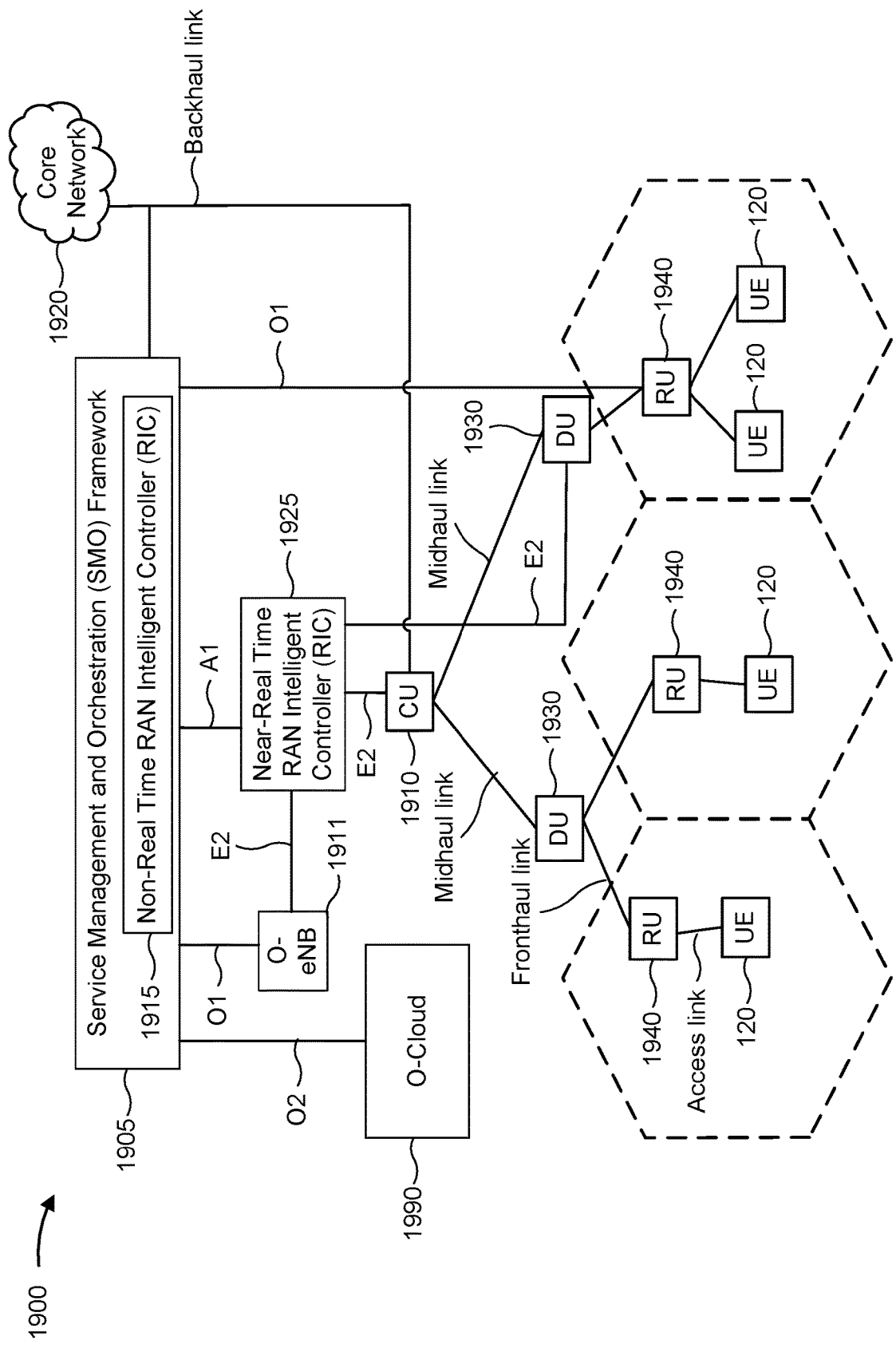
FIG. 19 is a diagram illustrating an example of a disaggregated base station architecture, in accordance with the present disclosure.

FIG. 19 is a diagram illustrating an example 1900 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 19 may include one or more CUs 1910 that can communicate directly with a core network 1920 via a backhaul link, or indirectly with the core network 1920 through one or more disaggregated base station units (such as a Near-RT RIC 1925 via an E2 link, or a Non-RT RIC 1915 associated with a Service Management and Orchestration (SMO) Framework 1905, or both). A CU 1910 may communicate with one or more DUs 1930 via respective midhaul links, such as an F1 interface. The DUs 1930 may communicate with one or more RUs 1940 via respective fronthaul links. The RUs 1940 may communicate with respective UEs 120 via one or more radio frequency (RF) access links. In some implementations, the UE 120 may be simultaneously served by multiple RUs 1940.

Each of the units (e.g., the CUS 1910, the DUs 1930, the RUs 1940), as well as the Near-RT RICs 1925, the Non-RT RICs 1915, and the SMO Framework 1905, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1910 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1910. The CU 1910 may be configured to handle user plane functionality (e.g., Central Unit-User Plane (CU-UP)), control plane functionality (e.g., Central Unit-Control Plane (CU-CP)), or a combination thereof. In some implementations, the CU 1910 can be logically split into one or more CU-UP units and one or more CU-CP units. The CU-UP unit can communicate bidirectionally with the CU-CP unit via an interface, such as the E1 interface when implemented in an O-RAN configuration. The CU 1910 can be implemented to communicate with the DU 1930, as necessary, for network control and signaling.

The DU 1930 may correspond to a logical unit that includes one or more base station functions to control the operation of one or more RUs 1940. In some aspects, the DU 1930 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 1930 may further host one or more low-PHY layers. Each layer (or module) can be implemented with an interface configured to communicate signals with other layers (and modules) hosted by the DU 1930, or with the control functions hosted by the CU 1910.

Lower-layer functionality can be implemented by one or more RUs 1940. In some deployments, an RU 1940, controlled by a DU 1930, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1940 can be implemented to handle over the air (OTA) communication with one or more UEs 120. In some implementations, real-time and non-real-time aspects of control and user plane communication with the RU(s) 1940 can be controlled by the corresponding DU 1930. In some scenarios, this configuration can enable the DU(s) 1930 and the CU 1910 to be implemented in a cloud-based RAN architecture, such as a vRAN architecture.

The SMO Framework 1905 may be configured to support RAN deployment and provisioning of non-virtualized and virtualized network elements. For non-virtualized network elements, the SMO Framework 1905 may be configured to support the deployment of dedicated physical resources for RAN coverage requirements which may be managed via an operations and maintenance interface (such as an O1 interface). For virtualized network elements, the SMO Framework 1905 may be configured to interact with a cloud computing platform (such as an open cloud (O-Cloud) 1990) to perform network element life cycle management (such as to instantiate virtualized network elements) via a cloud computing platform interface (such as an O2 interface). Such virtualized network elements can include, but are not limited to, CUs 1910, DUs 1930, RUs 1940 and Near-RT RICs 1925. In some implementations, the SMO Framework 1905 can communicate with a hardware aspect of a 4G RAN, such as an open eNB (O-eNB) 1911, via an O1 interface. Additionally, in some implementations, the SMO Framework 1905 can communicate directly with one or more RUs 1940 via an O1 interface. The SMO Framework 1905 also may include a Non-RT RIC 1915 configured to support functionality of the SMO Framework 1905.

The Non-RT RIC 1915 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1925. The Non-RT RIC 1915 may be coupled to or communicate with (such as via an A1 interface) the Near-RT RIC 1925. The Near-RT RIC 1925 may be configured to include a logical function that enables near-real-time control and optimization of RAN elements and resources via data collection and actions over an interface (such as via an E2 interface) connecting one or more CUs 1910, one or more DUs 1930, or both, as well as an O-eNB, with the Near-RT RIC 1925.

In some implementations, to generate AI/ML models to be deployed in the Near-RT RIC 1925, the Non-RT RIC 1915 may receive parameters or external enrichment information from external servers. Such information may be utilized by the Near-RT RIC 1925 and may be received at the SMO Framework 1905 or the Non-RT RIC 1915 from non-network data sources or from network functions. In some examples, the Non-RT RIC 1915 or the Near-RT RIC 1925 may be configured to tune RAN behavior or performance. For example, the Non-RT RIC 1915 may monitor long-term trends and patterns for performance and employ AI/ML models to perform corrective actions through the SMO Framework 1905 (such as reconfiguration via O1) or via creation of RAN management policies (such as A1 policies).

As indicated above, FIG. 19 is provided as an example. Other examples may differ from what is described with regard to FIG. 19.

The following provides an overview of some Aspects of the present disclosure:

Aspect 1: A method of wireless communication performed by a user equipment (UE), comprising: receiving, from a network node, downlink control information (DCI) that includes a request for a dropped hybrid automatic repeat request (HARQ) codebook, wherein the DCI indicates a codebook identifier (ID) associated with the dropped HARQ codebook; and transmitting, to the network node, the dropped HARQ codebook based at least in part on the codebook ID associated with the dropped HARQ codebook, as indicated in the DCI.

Aspect 2: The method of Aspect 1, wherein the DCI indicates one or more of: a codebook number associated with the dropped HARQ codebook, a codebook range per component carrier, or a codebook range common to a plurality of component carriers, and wherein the codebook number is associated with an implicit codebook concatenation order or an explicit codebook concatenation order based at least in part on the request included in the DCI.

Aspect 3: The method of any of Aspects 1 through 2, wherein the codebook ID is a DCI field that supports a request of up to 16 dropped HARQ codebooks.

Aspect 4: The method of any of Aspects 1 through 3, wherein: the dropped HARQ codebook is associated with a missed DCI, and wherein the missed DCI indicates the codebook ID; or the dropped HARQ codebook is associated with a low priority physical uplink control channel (PUCCH) transmission that conflicts with a high priority PUCCH transmission, and wherein the low priority PUCCH transmission is associated with a low priority physical downlink shared channel transmission that indicates the codebook ID.

Aspect 5: The method of any of Aspects 1 through 4, wherein the dropped HARQ codebook is associated with a missed DCI and a codebook ID indicated by the missed DCI is not available at the UE, and further comprising: transmitting, to the network node, available HARQ codebooks associated with codebook IDs available at the UE, wherein the available HARQ codebooks are concatenated in a physical uplink control channel based at least in part on an order indicated in the DCI, and wherein the UE is configured to perform no HARQ codebook transmission for a single dropped HARQ codebook.

Aspect 6: The method of any of Aspects 1 through 5, wherein the dropped HARQ codebook is associated with a missed DCI and a codebook ID indicated by the missed DCI is not available at the UE, and further comprising: transmitting, to the network node, a negative acknowledgement for each non-available HARQ codebook.

Aspect 7: The method of any of Aspects 1 through 6, wherein the dropped HARQ codebook is associated with a missed DCI and a codebook ID indicated by the missed DCI is not available at the UE, wherein the DCI indicates a quantity of negative acknowledgement (NACK) bits associated with the dropped HARQ codebook, and wherein the quantity of NACK bits indicate a requested codebook length due to the missed DCI.

Aspect 8: The method of any of Aspects 1 through 7, wherein transmitting the dropped HARQ codebook comprises transmitting one bit for the dropped HARQ codebook, wherein the one bit corresponds to a logical AND operation of a plurality of HARQ bits associated with the dropped HARQ codebook.

Aspect 9: The method of any of Aspects 1 through 8, wherein the DCI indicates a semi-persistent scheduling (SPS) physical uplink control channel (PUCCH) ID associated with the dropped HARQ codebook, and wherein the DCI indicating the SPS PUCCH ID indicates a PUCCH resource indicator associated with transmitting the dropped HARQ codebook.

Aspect 10: The method of Aspect 9, wherein an SPS PUCCH numbering is applicable based at least in part on an SPS PUCCH HARQ not multiplexed with HARQ feedback corresponding to a downlink grant physical downlink shared channel (PDSCH), or wherein the SPS PUCCH numbering is applicable based at least in part on the SPS PUCCH HARQ being multiplexed with uplink control information (UCI) corresponding to the downlink grant PDSCH.

Aspect 11: The method of Aspect 10, wherein the SPS PUCCH numbering is a unique SPS PUCCH numbering based at least in part on a plurality of component carriers.

Aspect 12: The method of Aspect 10, wherein the DCI indicates the codebook ID or the SPS PUCCH numbering, the UCI indicates the codebook ID, or an SPS PUCCH indicates the SPS PUCCH ID.

Aspect 13: The method of any of Aspects 1 through 12, wherein the DCI indicates one or more of: a request for the dropped HARQ codebook, a physical uplink control channel resource indicator or a physical uplink shared channel associated with a transmission of the dropped HARQ codebook, or a quantity of negative acknowledgement bits per dropped HARQ codebook.

Aspect 14: The method of any of Aspects 1 through 13, wherein the DCI is associated with HARQ codebooks for a downlink grant physical downlink shared channel transmission, or wherein the DCI is associated with HARQ codebooks for a semi-persistent scheduling PDSCH transmission.

Aspect 15: A method of wireless communication performed by a network node, comprising: transmitting, to a user equipment (UE), downlink control information (DCI) that includes a request for a dropped hybrid automatic repeat request (HARQ) codebook, wherein the DCI indicates a codebook identifier (ID) associated with the dropped HARQ codebook; and receiving, from the UE, the dropped HARQ codebook based at least in part on the codebook ID associated with the dropped HARQ codebook, as indicated in the DCI.

Aspect 16: The method of Aspect 15, wherein the DCI indicates one or more of: a codebook number associated with the dropped HARQ codebook, a codebook range per component carrier, or a codebook range common to a plurality of component carriers, and wherein the codebook number is associated with an implicit codebook concatenation order or an explicit codebook concatenation order based at least in part on the request included in the DCI.

Aspect 17: The method of any of Aspects 15 through 16, wherein the codebook ID is a DCI field that supports a request of up to 16 dropped HARQ codebooks.

Aspect 18: The method of any of Aspects 15 through 17, wherein: the dropped HARQ codebook is associated with a missed DCI, and wherein the missed DCI indicates the codebook ID; or the dropped HARQ codebook is associated with a low priority physical uplink control channel (PUCCH) transmission that conflicts with a high priority PUCCH transmission, and wherein the low priority PUCCH transmission is associated with a low priority physical downlink shared channel transmission that indicates the codebook ID.

Aspect 19: The method of any of Aspects 15 through 18, wherein the dropped HARQ codebook is associated with a missed DCI and a codebook ID indicated by the missed DCI is not available at the UE, and further comprising: receiving, from the UE, available HARQ codebooks associated with codebook IDs available at the UE, wherein the available HARQ codebooks are concatenated in a physical uplink control channel based at least in part on an order indicated in the DCI, and wherein the UE is configured to perform no HARQ codebook transmission for a single dropped HARQ codebook.

Aspect 20: The method of any of Aspects 15 through 19, wherein the dropped HARQ codebook is associated with a missed DCI and a codebook ID indicated by the missed DCI is not available at the UE, and further comprising: receiving, from the UE, a negative acknowledgement for each non-available HARQ codebook.

Aspect 21: The method of any of Aspects 15 through 20, wherein the dropped HARQ codebook is associated with a missed DCI and a codebook ID indicated by the missed DCI is not available at the UE, wherein the DCI indicates a quantity of negative acknowledgement (NACK) bits associated with the dropped HARQ codebook, and wherein the quantity of NACK bits indicate a requested codebook length due to the missed DCI.

Aspect 22: The method of any of Aspects 15 through 21, wherein receiving the dropped HARQ codebook comprises receiving one bit for the dropped HARQ codebook, wherein the one bit corresponds to a logical AND operation of a plurality of HARQ bits associated with the dropped HARQ codebook.

Aspect 23: The method of any of Aspects 15 through 22, wherein the DCI indicates a semi-persistent scheduling (SPS) physical uplink control channel (PUCCH) ID associated with the dropped HARQ codebook, and wherein the DCI indicating the SPS PUCCH ID indicates a PUCCH resource indicator associated with transmitting the dropped HARQ codebook.

Aspect 24: The method of Aspect 23, wherein an SPS PUCCH numbering is applicable based at least in part on an SPS PUCCH HARQ not multiplexed with HARQ feedback corresponding to a downlink grant physical downlink shared channel (PDSCH), or wherein the SPS PUCCH numbering is applicable based at least in part on the SPS PUCCH HARQ being multiplexed with uplink control information (UCI) corresponding to the downlink grant PDSCH.

Aspect 25: The method of Aspect 24, wherein the SPS PUCCH numbering is a unique SPS PUCCH numbering based at least in part on a plurality of component carriers.

Aspect 26: The method of Aspect 24, wherein the DCI indicates the codebook ID or the SPS PUCCH numbering, the UCI indicates the codebook ID, or an SPS PUCCH indicates the SPS PUCCH ID.

Aspect 27: The method of any of Aspects 15 through 26, wherein the DCI indicates one or more of: a request for the dropped HARQ codebook, a physical uplink control channel resource indicator or a physical uplink shared channel associated with a transmission of the dropped HARQ codebook, or a quantity of negative acknowledgement bits per dropped HARQ codebook.

Aspect 28: The method of any of Aspects 15 through 27, wherein the DCI is associated with HARQ codebooks for a downlink grant physical downlink shared channel transmission, or wherein the DCI is associated with HARQ codebooks for a semi-persistent scheduling PDSCH transmission.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus of a user equipment (UE) for wireless communication, comprising:
a memory; and
one or more processors coupled to the memory, the memory storing instructions configurable to be executed by the one or more processors to cause the UE to:

receive, from a network node, downlink control information (DCI) that includes a request for a dropped hybrid automatic repeat request (HARQ) codebook, wherein the DCI indicates a codebook identifier (ID) associated with the dropped HARQ codebook; and transmit, to the network node, the dropped HARQ codebook based at least in part on the codebook ID associated with the dropped HARQ codebook, as indicated in the DCI.

2. The apparatus of claim 1, wherein the DCI indicates one or more of: a codebook number associated with the dropped HARQ codebook, a codebook range per component carrier, or a codebook range common to a plurality of component carriers, and wherein the codebook number is associated with an implicit codebook concatenation order or an explicit codebook concatenation order based at least in part on the request included in the DCI.

3. The apparatus of claim 1, wherein the codebook ID is a DCI field that supports a request of up to 16 dropped HARQ codebooks.

4. The apparatus of claim 1, wherein:
the dropped HARQ codebook is associated with a missed DCI, and wherein the missed DCI indicates the codebook ID; or
the dropped HARQ codebook is associated with a low priority physical uplink control channel (PUCCH) transmission that conflicts with a high priority PUCCH transmission, and wherein the low priority PUCCH transmission is associated with a low priority physical downlink shared channel transmission that indicates the codebook ID.

5. The apparatus of claim 1, wherein the dropped HARQ codebook is associated with a missed DCI and a codebook ID indicated by the missed DCI is not available at the UE, and wherein the instructions are further configurable to be executed by the one or more processors to cause the UE to:
transmit, to the network node, available HARQ codebooks associated with codebook IDs available at the UE, wherein the available HARQ codebooks are concatenated in a physical uplink control channel based at least in part on an order indicated in the DCI, and wherein the UE is configured to perform no HARQ codebook transmission for a single dropped HARQ codebook.

6. The apparatus of claim 1, wherein the dropped HARQ codebook is associated with a missed DCI and a codebook ID indicated by the missed DCI is not available at the UE, and wherein the instructions are further configurable to be executed by the one or more processors to cause the UE to:
transmit, to the network node, a negative acknowledgement for each non-available HARQ codebook.

7. The apparatus of claim 1, wherein the dropped HARQ codebook is associated with a missed DCI and a codebook ID indicated by the missed DCI is not available at the UE, wherein the DCI indicates a quantity of negative acknowledgement (NACK) bits associated with the dropped HARQ codebook, and wherein the quantity of NACK bits indicate a requested codebook length due to the missed DCI.

8. The apparatus of claim 1, wherein the instructions are further configurable to be executed by the one or more processors to cause the UE to transmit one bit for the dropped HARQ codebook, wherein the one bit corresponds to a logical AND operation of a plurality of HARQ bits associated with the dropped HARQ codebook.

9. The apparatus of claim 1, wherein the DCI indicates a semi-persistent scheduling (SPS) physical uplink control channel (PUCCH) ID associated with the dropped HARQ codebook, and wherein the DCI indicating the SPS PUCCH ID indicates a PUCCH resource indicator associated with transmitting the dropped HARQ codebook.

10. The apparatus of claim 9, wherein an SPS PUCCH numbering is applicable based at least in part on an SPS PUCCH HARQ not multiplexed with HARQ feedback corresponding to a downlink grant physical downlink shared channel (PDSCH), or wherein the SPS PUCCH numbering is applicable based at least in part on the SPS PUCCH HARQ being multiplexed with uplink control information (UCI) corresponding to the downlink grant PDSCH.

11. The apparatus of claim 10, wherein the SPS PUCCH numbering is a unique SPS PUCCH numbering based at least in part on a plurality of component carriers.

12. The apparatus of claim 10, wherein the DCI indicates the codebook ID or the SPS PUCCH numbering, the UCI indicates the codebook ID, or an SPS PUCCH indicates the SPS PUCCH ID.

13. The apparatus of claim 1, wherein the DCI indicates one or more of: a request for the dropped HARQ codebook, a physical uplink control channel resource indicator or a physical uplink shared channel (PUSCH) associated with a transmission of the dropped HARQ codebook, or a quantity of negative acknowledgement bits per dropped HARQ codebook, wherein the request for the dropped HARQ codebook indicates that the DCI is not for scheduling a PUSCH and is for requesting the dropped HARQ codebook.

14. The apparatus of claim 1, wherein the DCI is associated with HARQ codebooks for a downlink grant physical downlink shared channel transmission, or wherein the DCI is associated with HARQ codebooks for a semi-persistent scheduling PDSCH transmission.

15. An apparatus of a network node for wireless communication, comprising:
a memory; and
one or more processors coupled to the memory, the memory storing instructions configurable to be executed by the one or more processors to cause the network node to:
transmit, to a user equipment (UE), downlink control information (DCI) that includes a request for a dropped hybrid automatic repeat request (HARQ) codebook, wherein the DCI indicates a codebook identifier (ID) associated with the dropped HARQ codebook; and
receive, from the UE, the dropped HARQ codebook based at least in part on the codebook ID associated with the dropped HARQ codebook, as indicated in the DCI.

16. The apparatus of claim 15, wherein the DCI indicates one or more of: a codebook number associated with the dropped HARQ codebook, a codebook range per component carrier, or a codebook range common to a plurality of component carriers, and wherein the codebook number is associated with an implicit codebook concatenation order or an explicit codebook concatenation order based at least in part on the request included in the DCI.

17. The apparatus of claim 15, wherein the codebook ID is a DCI field that supports a request of up to 16 dropped HARQ codebooks.

18. The apparatus of claim 15, wherein:
the dropped HARQ codebook is associated with a missed DCI, and wherein the missed DCI indicates the codebook ID; or
the dropped HARQ codebook is associated with a low priority physical uplink control channel (PUCCH) transmission that conflicts with a high priority PUCCH transmission, and wherein the low priority PUCCH transmission is associated with a low priority physical downlink shared channel transmission that indicates the codebook ID.

19. The apparatus of claim 15, wherein the dropped HARQ codebook is associated with a missed DCI and a codebook ID indicated by the missed DCI is not available at the UE, and wherein the instructions are further configurable to be executed by the one or more processors to cause the network node to:
receive, from the UE, available HARQ codebooks associated with codebook IDs available at the UE, wherein the available HARQ codebooks are concatenated in a physical uplink control channel based at least in part on an order indicated in the DCI, and wherein the UE is configured to perform no HARQ codebook transmission for a single dropped HARQ codebook.

20. The apparatus of claim 15, wherein the dropped HARQ codebook is associated with a missed DCI and a codebook ID indicated by the missed DCI is not available at the UE, and wherein the instructions are further configurable to be executed by the one or more processors to cause the network node to:
receive, from the UE, a negative acknowledgement for each non-available HARQ codebook.

21. The apparatus of claim 15, wherein the dropped HARQ codebook is associated with a missed DCI and a codebook ID indicated by the missed DCI is not available at the UE, wherein the DCI indicates a quantity of negative acknowledgement (NACK) bits associated with the dropped HARQ codebook, and wherein the quantity of NACK bits indicate a requested codebook length due to the missed DCI.

22. The apparatus of claim 15, wherein the instructions are further configurable to be executed by the one or more processors to cause the network node to receive one bit for the dropped HARQ codebook, wherein the one bit corresponds to a logical AND operation of a plurality of HARQ bits associated with the dropped HARQ codebook.

23. The apparatus of claim 15, wherein the DCI indicates a semi-persistent scheduling (SPS) physical uplink control channel (PUCCH) ID associated with the dropped HARQ codebook, and wherein the DCI indicating the SPS PUCCH ID indicates a PUCCH resource indicator associated with transmitting the dropped HARQ codebook.

24. The apparatus of claim 23, wherein an SPS PUCCH numbering is applicable based at least in part on an SPS PUCCH HARQ not multiplexed with HARQ feedback corresponding to a downlink grant physical downlink shared channel (PDSCH), or wherein the SPS PUCCH numbering is applicable based at least in part on the SPS PUCCH HARQ being multiplexed with uplink control information (UCI) corresponding to the downlink grant PDSCH.

25. The apparatus of claim 24, wherein the SPS PUCCH numbering is a unique SPS PUCCH numbering based at least in part on a plurality of component carriers.

26. The apparatus of claim 24, wherein the DCI indicates the codebook ID or the SPS PUCCH numbering, the UCI indicates the codebook ID, or an SPS PUCCH indicates the SPS PUCCH ID.

27. The apparatus of claim 15, wherein the DCI indicates one or more of: a request for the dropped HARQ codebook, a physical uplink control channel resource indicator or a physical uplink shared channel associated with a transmission of the dropped HARQ codebook, or a quantity of negative acknowledgement bits per dropped HARQ codebook.

28. The apparatus of claim 15, wherein the DCI is associated with HARQ codebooks for a downlink grant physical downlink shared channel transmission, or wherein the DCI is associated with HARQ codebooks for a semi-persistent scheduling PDSCH transmission.

29. A method of wireless communication performed by a user equipment (UE), comprising:
receiving, from a network node, downlink control information (DCI) that includes a request for a dropped hybrid automatic repeat request (HARQ) codebook, wherein the DCI indicates a codebook identifier (ID) associated with the dropped HARQ codebook; and
transmitting, to the network node, the dropped HARQ codebook based at least in part on the codebook ID associated with the dropped HARQ codebook, as indicated in the DCI.

30. A method of wireless communication performed by a network node, comprising:
transmitting, to a user equipment (UE), downlink control information (DCI) that includes a request for a dropped hybrid automatic repeat request (HARQ) codebook, wherein the DCI indicates a codebook identifier (ID) associated with the dropped HARQ codebook; and
receiving, from the UE, the dropped HARQ codebook based at least in part on the codebook ID associated with the dropped HARQ codebook, as indicated in the DCI.

* * * * *